(12) United States Patent
Ninomiya et al.

(10) Patent No.: US 6,572,172 B1
(45) Date of Patent: Jun. 3, 2003

(54) ROTATING VEHICLE SEAT

(75) Inventors: Mineki Ninomiya, Kariya (JP); Masamitsu Iwatani, Kariya (JP); Yoshiyuki Miura, Kariya (JP); Kenji Murabayashi, Kariya (JP); Tomoyuki Kuroda, Kariya (JP); Masanori Iwao, Kariya (JP); Takafumi Hijikata, Kariya (JP); Yasuo Suga, Kariya (JP); Takayuki Tajima, Kariya (JP); Tadashi Takenoshita, Kokubu (JP); Yoshiro Suehiro, Kokubu (JP)

(73) Assignee: Toyota Shatai Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 09/394,963

(22) Filed: Sep. 10, 1999

(30) Foreign Application Priority Data

Sep. 10, 1998 (JP) .............................. 10-257033
Mar. 15, 1999 (JP) .............................. 11-068850
Apr. 13, 1999 (JP) .............................. 11-105721

(51) Int. Cl.$^7$ ................................................ B60N 2/02
(52) U.S. Cl. .............................. 296/65.12; 296/65.07; 297/344.23; 297/344.24
(58) Field of Search ........................... 296/65.06, 65.07, 296/65.11, 65.12; 297/344.23, 344.24

(56) References Cited

U.S. PATENT DOCUMENTS

| 2,290,464 | A | * | 7/1942 | Buchheit |
| 2,587,679 | A | | 3/1952 | Atkinson |
| 2,822,858 | A | | 2/1958 | Mussler |
| 4,483,653 | A | | 11/1984 | Waite |
| 4,733,903 | A | | 3/1988 | Bailey |
| 4,989,888 | A | | 2/1991 | Qureshi et al. |
| 5,094,420 | A | * | 3/1992 | Aihara et al. |
| 5,149,113 | A | | 9/1992 | Alldredge |
| 5,466,111 | A | | 11/1995 | Meyer |
| 5,524,952 | A | | 6/1996 | Czech et al. |
| 5,636,884 | A | * | 6/1997 | Ladetto et al. |
| 5,651,576 | A | * | 7/1997 | Wallace |
| 5,720,462 | A | * | 2/1998 | Brodersen |
| 5,769,480 | A | * | 6/1998 | Gebhardt |
| 5,890,764 | A | * | 4/1999 | Lee |
| 6,024,398 | A | * | 2/2000 | Horton et al. |

FOREIGN PATENT DOCUMENTS

| DE | 2655916 C2 | 7/1977 |
| EP | 0 656 277 A1 | 11/1994 |
| FR | 2 495 451 | 12/1980 |
| JP | 53-19954 | 2/1978 |
| JP | 57-22922 | 2/1982 |
| JP | 57-22925 | 2/1982 |
| JP | 58-164825 | 11/1983 |
| JP | 60-92752 | 5/1985 |
| JP | 62-43330 | 2/1987 |
| JP | 62-76036 | 5/1987 |
| JP | 62-173343 | 7/1987 |

(List continued on next page.)

OTHER PUBLICATIONS

Japanese Office Action, English translation, Jul. 10, 2001—mailing date.

(List continued on next page.)

*Primary Examiner*—D. Glenn Dayoan
*Assistant Examiner*—Scott Carpenter

(57) ABSTRACT

A longitudinal support base 30 is provided with a rotating support base 10 that can be slide in a longitudinal direction of the vehicle. A seat body is placed on the rotating support base 10 via a rotary disc 13 so as to rotate. The longitudinal support base 30 is provided with an intermediate gear 22 that is engaged with a rack 21 extending in the longitudinal direction of the vehicle seat. The seat body 2 side is provided with a pinion gear 24 that is engaged with the intermediate gear 11. The rotary disc 13 is rotated by means of a driving force of an electric motor 41. Thus, when the electric motor 41 is rotated, the seat body 2 rotates and slides in the longitudinal direction.

75 Claims, 32 Drawing Sheets

| | FOREIGN PATENT DOCUMENTS | |
|---|---|---|
| JP | 62-295660 | 12/1987 |
| JP | 362283027 * | 12/1987 |
| JP | 363176752 * | 7/1988 |
| JP | 401266031 * | 10/1989 |
| JP | 2-69801 | 6/1990 |
| JP | 2-89804 | 8/1990 |
| JP | 3-71932 | 7/1991 |
| JP | 04269526 | 9/1992 |
| JP | 5-5551 | 1/1993 |
| JP | 5-28740 | 4/1993 |
| JP | 5-40027 | 5/1993 |
| JP | 5-56581 | 7/1993 |
| JP | 5-305112 | 11/1993 |
| JP | 5-93966 | 12/1993 |
| JP | 6-895 | 1/1994 |
| JP | 6-27298 | 4/1994 |
| JP | 6-63426 | 9/1994 |
| JP | 406262971 * | 9/1994 |
| JP | 06306845 | 11/1994 |
| JP | 7-4149 | 1/1995 |
| JP | 07004990 | 1/1995 |
| JP | 7-323767 | 12/1995 |
| JP | 8-300988 | 11/1996 |
| JP | 9-48271 | 2/1997 |
| JP | 9-86233 | 3/1997 |
| JP | 9-183325 | 7/1997 |
| WO | WO93/18318 | 9/1993 |
| WO | WO98/43849 | 10/1998 |

OTHER PUBLICATIONS

U.S. patent application Ser. No. 09/414,056; filed Oct. 7, 1999; entitled "Vehicle Seat"; Specification and drawings 78 pages.

U.S. patent application Ser. No. 09/509,374; filed Oct. 10, 2000; entitled "Vehicular Turning Seat" amended from "Rotating Vehicle Seat"; Specification and drawings 178 pages.

U.S. patent application Ser. No. 09/788,884; filed Feb. 20, 2001; entitled "Rotating Vehicle Seat"; Specification and drawings 53 pages.

Translation of Office Action issued from Japanese Patent Office dated Mar. 28, 2000 for Application No. 10–288198.

Translation of Office Action issued from Japanese Patent Office dated Mar. 28, 2000 for application No. 10–298789.

Translation of Office Action issued from Japanese Patent Office dated Mar. 28, 2000 for Application No. 11–115074.

Office Action issued from the Australian Patent Office dated Dec. 24, 1999.

International Search Report (PCT/JP98/03872) dated Oct. 15, 1998.

European Search Report dated Dec. 27, 1999.

* cited by examiner

ROTATING VEHICLE SEAT

BACKGROUND OF THE INVENTION

1. Field of the Invention

The present invention relates to rotating vehicle seats and in particular, to rotating vehicle seats that can assist a passenger, such as an elderly person or a handicapped person, when entering or exiting a vehicle.

2. Description of the Related Art

Various improvements have been made over the years for such a rotating vehicle seat. In many cases, the passenger entry/exit assistance in such a rotating vehicle seat is performed by combining two movements, i.e., a horizontally rotating movement and a longitudinal sliding movement. In such a rotating vehicle seat with rotating and sliding mechanisms, when the rotating and sliding seat movements are performed by an operator or helper, the operator's load can become especially heavy, in particular, when a heavy person is sitting on the seat.

In order to reduce the operator's load, for example, Japanese Laid-open Utility Model Publication (Kokai) No. 5-40027 disclosed a rotating vehicle seat that performs a rotating movement and a sliding movement of the seat by means of an electric motor. However, in the above known rotating vehicle seat, the construction of the driving mechanism is complicated, and more space is necessary to store the driving mechanism within the vehicle. For this reason, it is difficult to use the known rotating vehicle seat in a small-sized vehicle.

SUMMARY OF THE INVENTION

It is, therefore, an object of the present invention to overcome this problem with the known rotating vehicle seat and to teach a simple driving mechanism, which can assist in reducing space requirements for rotating vehicle seats.

According to a first representative embodiment, a seat base may be disposed on a support and can both rotate and move in a longitudinal direction with respect to the vehicle. A driving mechanism and a driving source for driving the driving mechanism are provided. The driving mechanism may rotate the seat base when the seat base is situated between first (driving) position for sitting safely while driving and a second (intermediate) position, in which the seat base is rotated by a predetermined angle between the first position and a third (vehicle entry/exit) position. The driving mechanism also may rotate the seat base while moving the support base in the longitudinal direction of the vehicle when the seat base is between the intermediate position and the vehicle entry/exit position.

In this representative embodiment, the driving mechanism may have a simple construction and a compact size; therefore, the driving mechanism may be disposed within a lower surface of a seat body. Moreover, because the seat base only rotates between the first and second positions, and rotates and moves in the longitudinal direction between the second and third positions, the space requirements for rotating the seat base can be reduced.

The driving mechanism may include a rotating mechanism and a moving mechanism. The driving force of the driving source can be transmitted to the seat base via the rotating mechanism; on the other hand, a rotational force of the seat base can be transmitted to the support base via the moving mechanism. Thus, the construction of the driving mechanism can be further simplified. The moving mechanism may include, for example, a pinion gear, an intermediate gear that is engaged with the pinion gear, and a rack that is engaged with the intermediate gear. Thus, the size of the driving mechanism can be reduced, thereby reducing the space requirements of the driving mechanism.

Rotating vehicle seats are also taught that can smoothly change from a state in which a seat base only rotates to a state in which the seat base rotates and moves.

According to another representative embodiment, a seat base may again be disposed on a support and can both rotate and move in a longitudinal direction with respect to the vehicle. A driving mechanism and a restricting mechanism are also provided. The driving mechanism can preferably simultaneously move the seat base in the longitudinal direction with respect to the vehicle body and rotate the seat base, when the seat base is between the second and third position. The restricting mechanism can preferably restrict the support base from moving in the longitudinal direction of the vehicle when the seat base is between the first and second positions.

The driving mechanism may include, for example, a pinion gear, an intermediate gear that is engaged with the pinion gear, and a rack that is engaged with the intermediate gear. In this case, when the seat base changes from only rotating to rotating and moving, the change can be performed without causing variations in the relative positional relationship between the intermediate gear and the pinion gear.

The restricting mechanism may include, for example, a guide roller that is provided in the intermediate gear, and a restricting cam that is provided on the seat base and has a cam surface engaged with the guide roller. Thus, the construction of the restricting mechanism may be simplified.

Other objects, features and advantages of the present invention will be readily understood after reading the following detailed description together with the accompanying drawings and the claims.

DETAILED DESCRIPTION OF THE INVENTION

Figure 1:
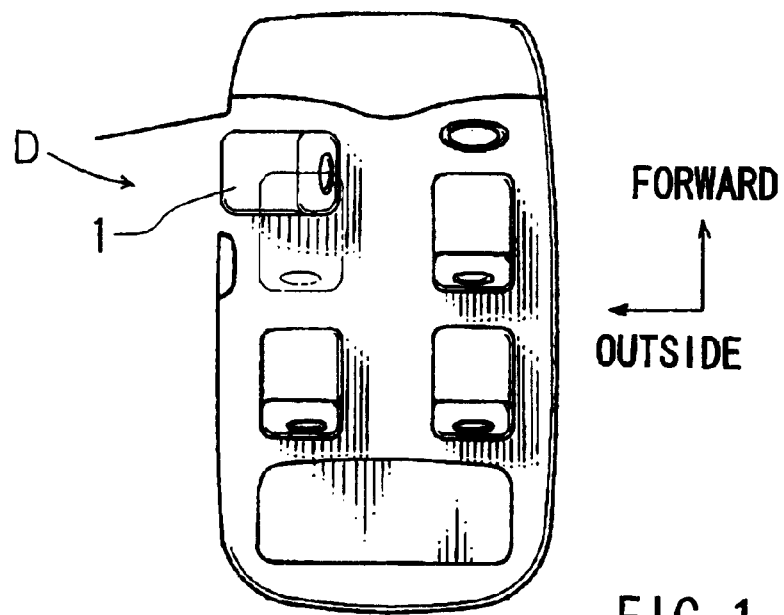
FIG. 1 is a top plan view showing the interior arrangement of a rotating vehicle seat.

A rotating vehicle seat according to a first representative embodiment will be described below with reference to FIGS. 1 to 8. In this first representative embodiment, a rotating vehicle seat (hereinafter, referred to simply as "rotating seat") 1 is set on a passenger seat on the left of the driver's seat, as shown in FIG. 1. In this case, a door opening D is provided to the left of the rotating seat 1. The rotating seat 1 rotates and slides between a sitting (first) position and a vehicle entry/exit (third) position. The sitting position means a position where the rotating seat is directed towards the front of the vehicle and the passenger is seated safely for driving. On the other hand, the vehicle entry/exit position means a position in which the seat is directed towards the door opening D. In order to move from the sitting position to the vehicle entry/exit position, the rotating seat may slide forward in the longitudinal direction of the vehicle while rotating approximately 90° (rotating in a counterclockwise direction as shown in FIG. 1)

Figure 2:
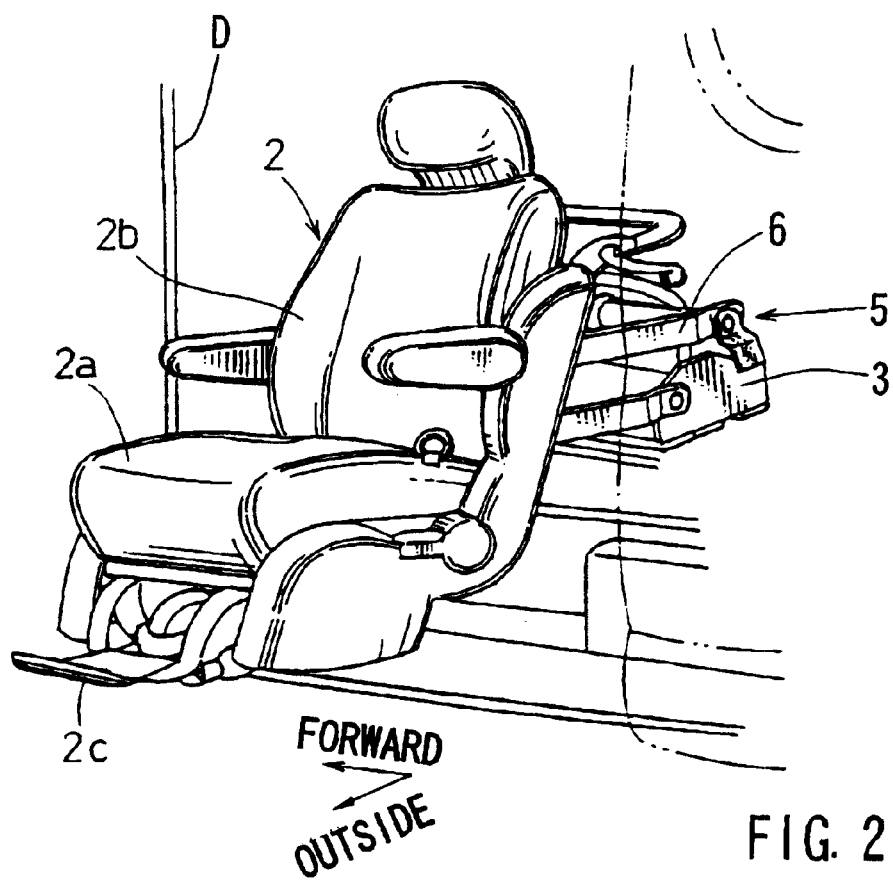
FIG. 2 is a perspective view showing a seat body and a lift up mechanism of the rotating vehicle seat.
Figure 3:
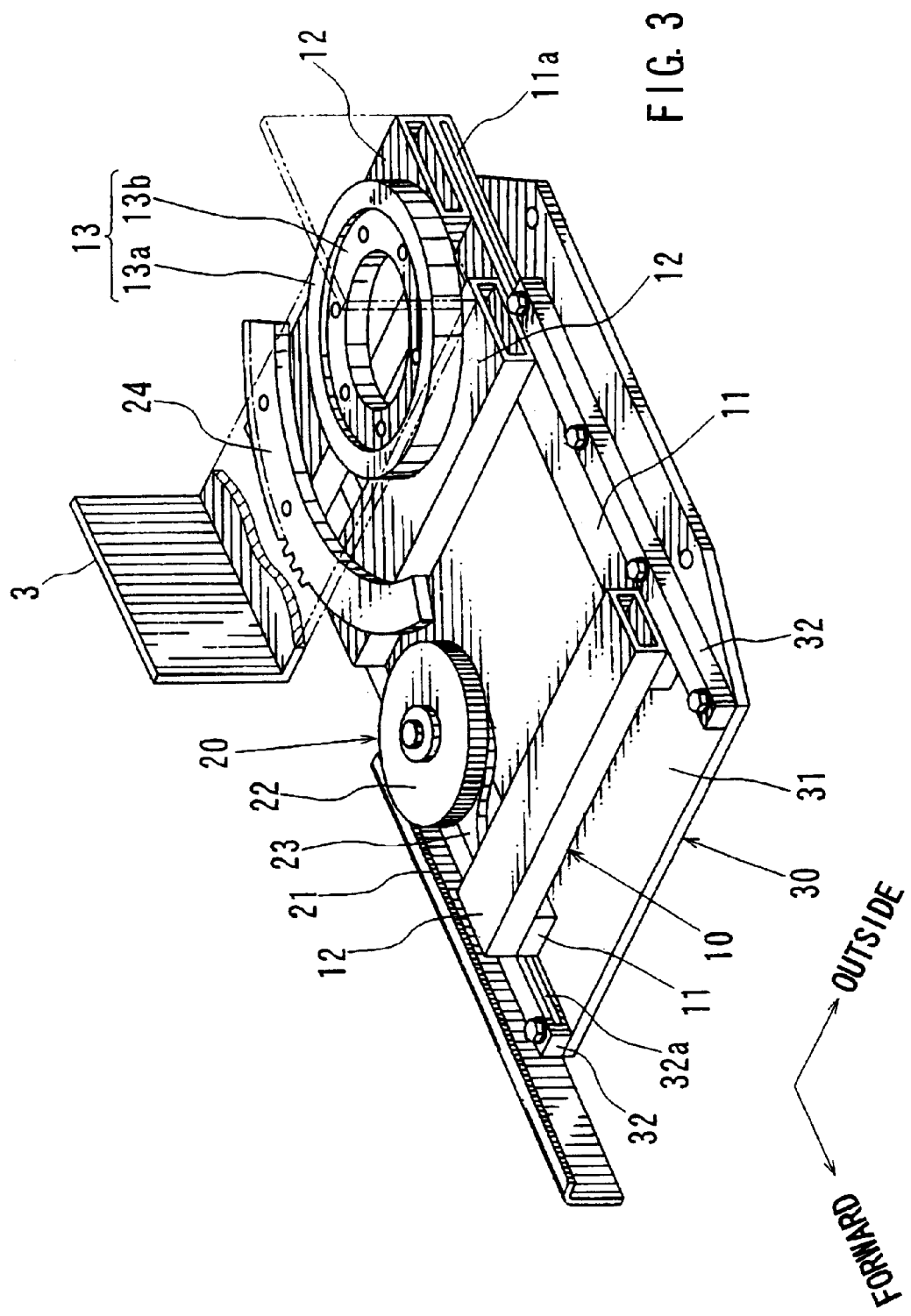
FIG. 3 is a perspective view showing a rotating support base and a longitudinal support base according to a first representative embodiment.

The rotating seat 1 of this first representative embodiment includes a seat body (also used as a wheelchair) 2; a rotating support base 10 for rotatably supporting the seat body 2; and a longitudinal support base (support base) 30 for slidably supporting both the seat body 2 and the rotating support base 10 in a longitudinal direction of the vehicle. FIG. 2 shows the details of the seat body 2 and FIG. 3 shows the details of the rotating support base 10 and the longitudinal support base 30. In these figures, direction towards the front of the vehicle is shown by arrow "Forward", and the door opening side is shown by arrow "Outside".

As shown in FIG. 2, the seat body 2 has a seat cushion 2a and a seat back 2b. A foot rest 2c is attached to the seat cushion 2a at a front portion thereof. This seat body 2 may preferably have the same construction as the known rotating vehicle seat. In this first representative embodiment, a seat base 3 is provided with a lift up mechanism 5 for detachably (connectably and releasably) supporting the seat body 2. The lift up mechanism 5 is mainly composed of a pair of quadric link mechanisms 6. In the vehicle entry/exit position, the seat body 2 can be lifted up and set down in a substantially circular arc between the interior and the outside of a vehicle (when viewing from the front of the longitudinal direction of the vehicle) by a swing lift up and down movement of the quadric link mechanism 6 of the lift up mechanism 5. Thus, the seat body 2 is capable of moving in and out of the door opening D.

As shown in FIG. 3, the rotating support base 10 has a base 12, a movable retaining member 11 and a rotary disc 13. The base 12 extends in the width direction of the vehicle, and a plurality (three in FIG. 3) of the bases 12 are arranged at a predetermined interval in the longitudinal direction of the vehicle. Two movable retaining members 11 are located right and left so as to mutually join opposite ends of each base 12. The rotary disc 13 is located so as to ride on a surface of the rear and intermediate bases 12. Further, the rotary disc 13 has an outer ring 13a and an inner ring 13b. The outer ring 13a and the inner ring 13b are constructed so as to smoothly rotate by means of a plurality of bearings (not shown) interposed between these rings 13a and 13b. In this first representative embodiment, the inner ring 13b is fixed onto the base 12, and the seat base 3 is fixed onto the outer ring 13a. Further, the seat body 2 is detachably placed on the seat base 3 via the lift up mechanism 5. Thus, the seat body 2 is supported to horizontally rotate with respect to the rotating support base 10 together with the seat base 3.

As shown in FIG. 3, the longitudinal support base 30 includes a base 31 that has a substantially rectangular long plate extending in a longitudinal direction of the vehicle. The base 31 is horizontally fixed to the vehicle floor (vehicle body). Further, the base 31 is provided with two stationary retaining members 32 that are arranged in parallel with each other in the width direction of the vehicle at upper surfaces of both ends. The stationary retaining member 32 extends in the longitudinal direction of the vehicle, and supports the movable retaining member 11 of the rotating support base 10 so that the member 11 can slide in the longitudinal direction of the vehicle.

Figure 4:
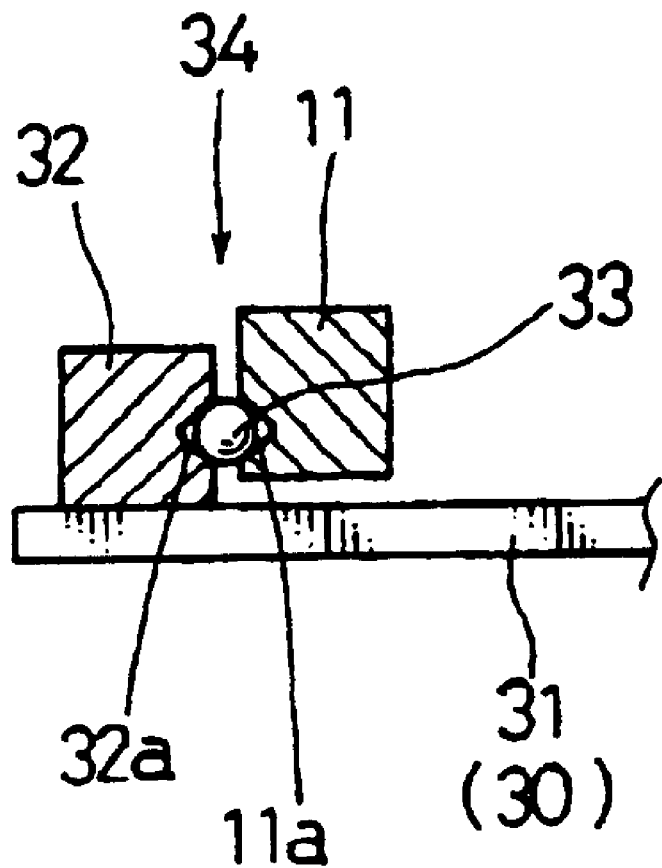
FIG. 4 is a cross sectional view showing a linear guide mechanism for guiding movement of the rotating support of the first representative embodiment.

The stationary retaining members 32 and the movable retaining member 11 are arranged so as to face each other at their one side. As shown in FIG. 4, these members 11 and 32 are respectively formed with V-shaped grooves 11a and 32a that longitudinally extend at their facing side. A plurality of bearings 33 are fitted and held between these V-shaped grooves 11a and 32a. In the aforesaid manner, a pair of linear guide mechanisms 34 is constructed. Therefore, the rotating support base 10 and therefore, the seat body 2, are supported so as to slide in the longitudinal direction of the vehicle.

Figure 5:
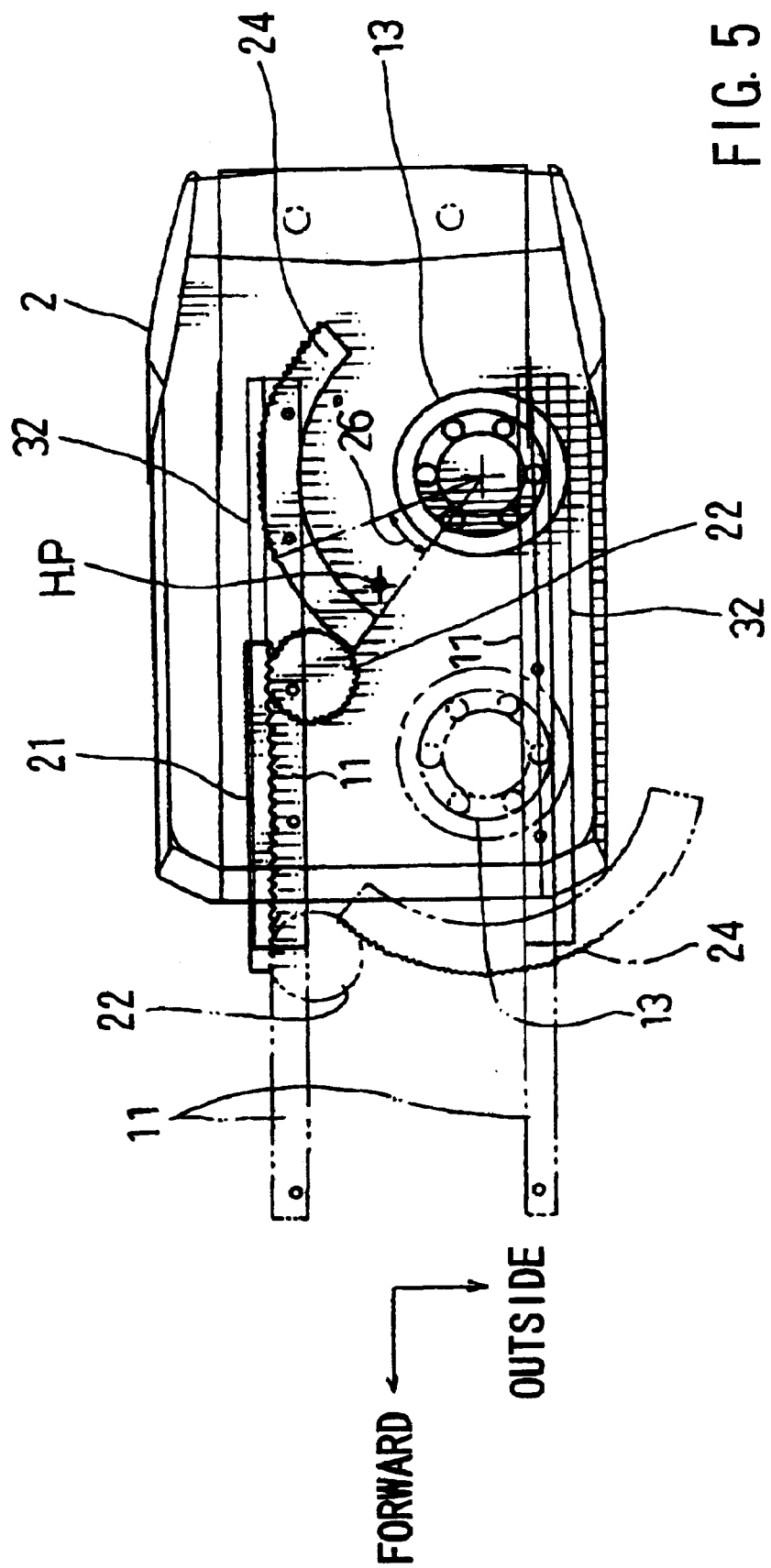
FIG. 5 is a top plan view showing a driving mechanism for performing the rotating longitudinal sliding movements of the seat body of the first representative embodiment.

A rotation/slide interlocking mechanism 20 for interlocking the rotating movement and the sliding movement of the seat body 2 will be described below with reference to FIGS. 3 to 5. The rotation/slide interlocking mechanism 20 is composed of a rack 21, an intermediate gear 22 and a pinion gear 24. The rack 21 is attached to a side of the stationary retaining member 32 on an interior side. The intermediate gear 22 is attached onto an upper surface of the movable retaining member 11 on an interior side via a support plate 23 so as to engage the rack 21 and rotate. In this case, a position and length of the rack 21 are determined so that an engagement of the intermediate gear 22 and the rack 21 is set within a range of the entire range of movement of the seat body 2 in the longitudinal direction of the vehicle.

On the other hand, the pinion gear 24 is fixed onto a lower surface of the seat base 3 that supports the seat body 2. Further, the pinion gear 24 is formed into a circular arc shape having a rotational angle range of about 90° around the rotary axis of the seat base 3. In addition, the pinion gear 24 does not have an engaging tooth in a predetermined angular range (an angle of about 26° in this first representative embodiment) on the initial engaging side (end portion of pinion gear in the counterclockwise direction). Therefore, at the initial time when the seat body 2 starts to rotate from the sitting position (shown by a solid line in FIG. 5, that is, position where the seat is directed to the longitudinal direction of the vehicle) toward the door opening D (counterclockwise direction in FIG. 5), the pinion gear 24 and the intermediate gear 22 are not engaged with each other in the angular range of about 26°. In this angular range of about 26°, the seat body 2 is merely rotated, and is not slid in the longitudinal direction of the vehicle (solely rotatng state).

When the seat body 2 is further rotated toward the door opening D, the pinion gear 24 is engaged with the intermediate gear 22. Therefore, the intermediate gear 22 is rotated in an interlocking manner (i.e. in unison) with the rotating movement of the seat body 2. The intermediate gear 22 is engaged with the rack 21; for this reason, the intermediate gear 22 is moved toward the front of vehicle while being rotated. In the range as described above, the rotating support base 10, to which the intermediate gear 22 is attached, is slid toward the front of vehicle, and therefore, the seat body 2 is rotated to the door opening D while being slid toward the front of vehicle (interlocking state).

Figure 6:
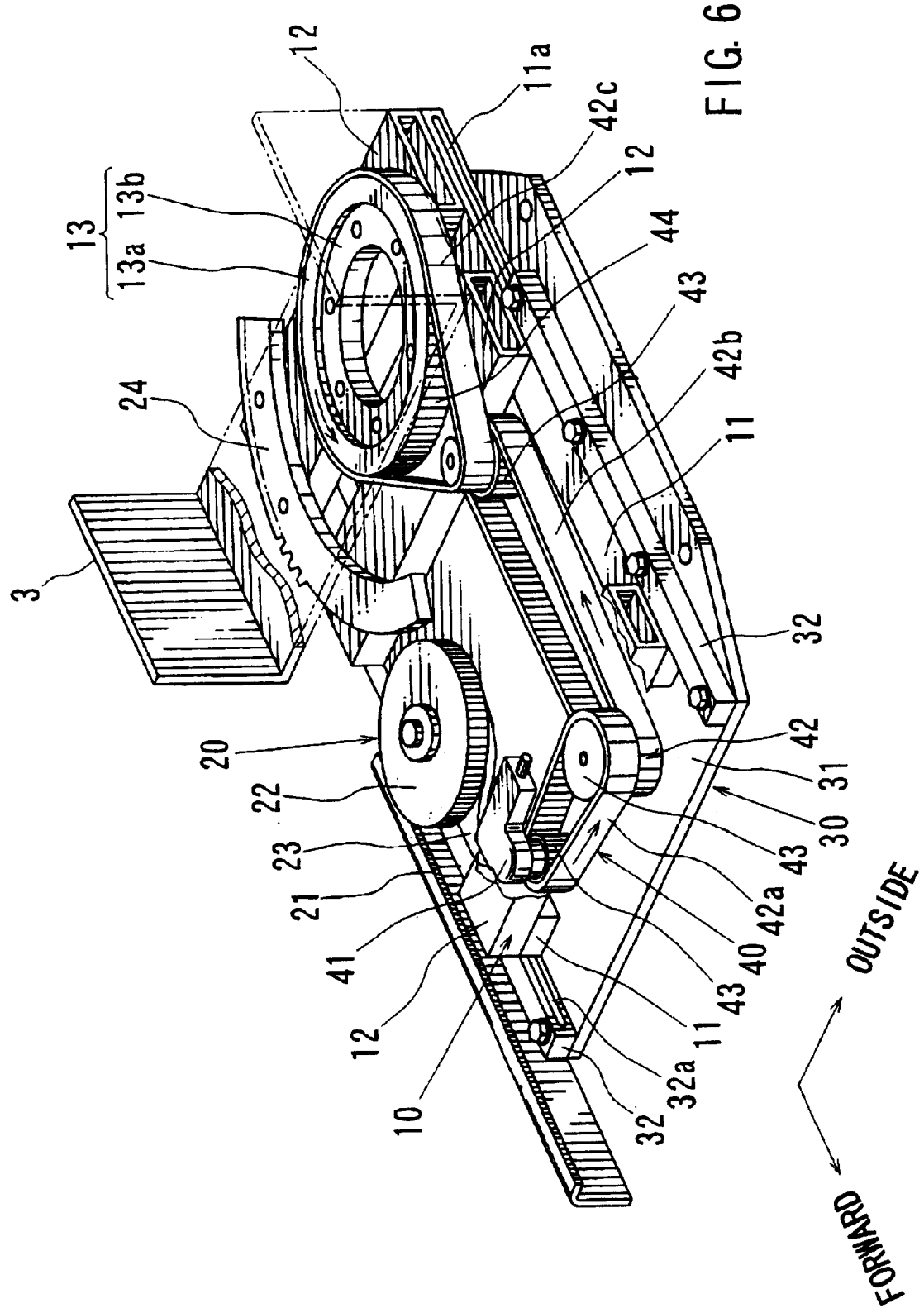
FIG. 6 is a perspective view showing a driving mechanism according to a first representative embodiment.
Figure 7:
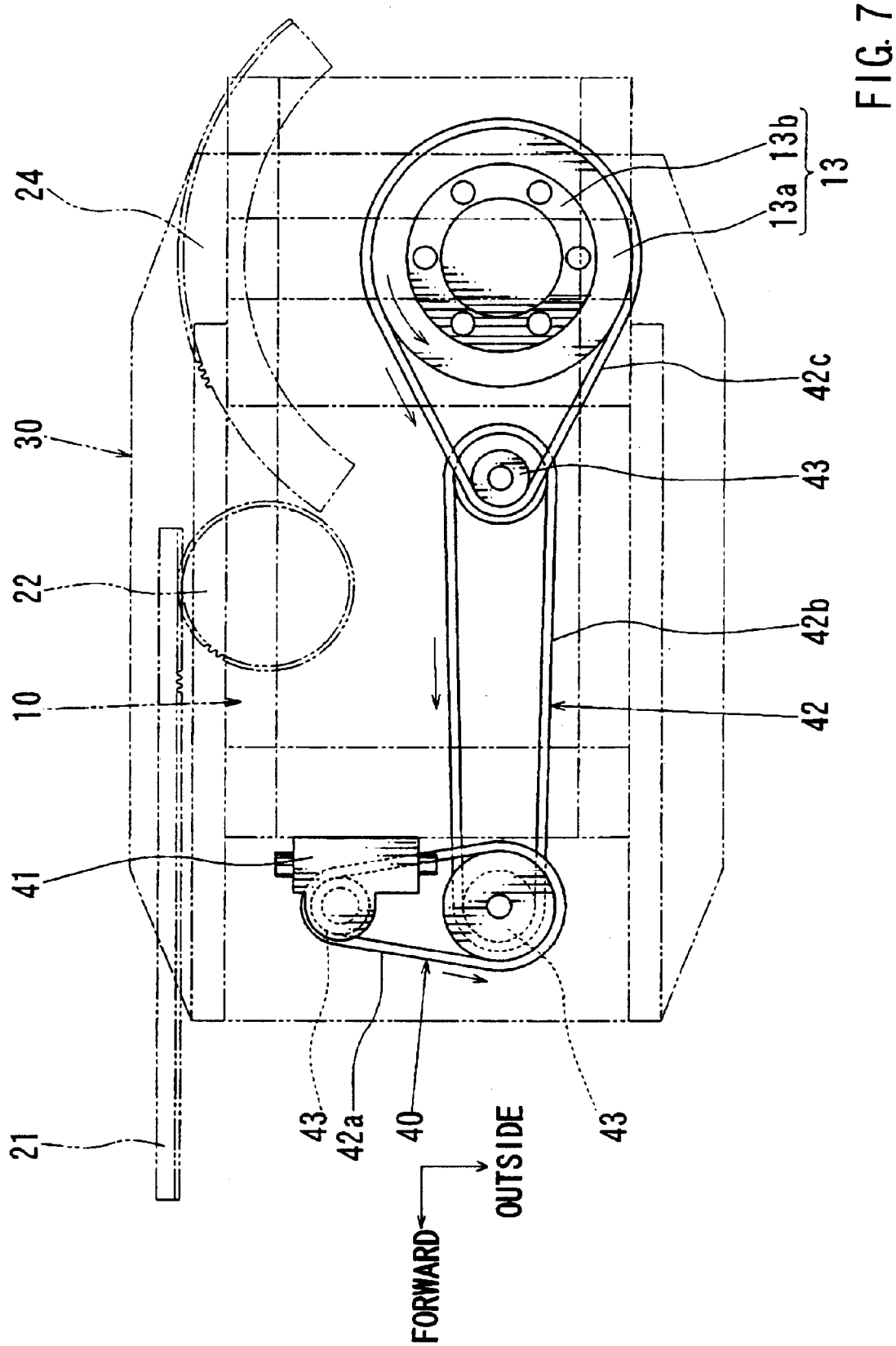
FIG. 7 is a top plan view showing the driving mechanism according to the first representative embodiment.
Figure 8:
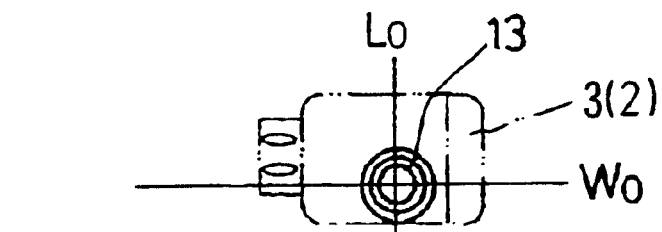
FIG. 8(A) is a top plan view showing the seat body in the sitting position.
FIG. 8(B) is a top plan view showing an intermediate state in which the seat body has been rotated toward the door opening from the sitting position by an angle of about 26°.
FIG. 8(C) is a top plan view showing a traversal state that the seat body is situated on a vehicle entry/exit position.
FIG. 8(D) is a top plan view showing the seat body in the vehicle entry/exit position.
Figure 8:
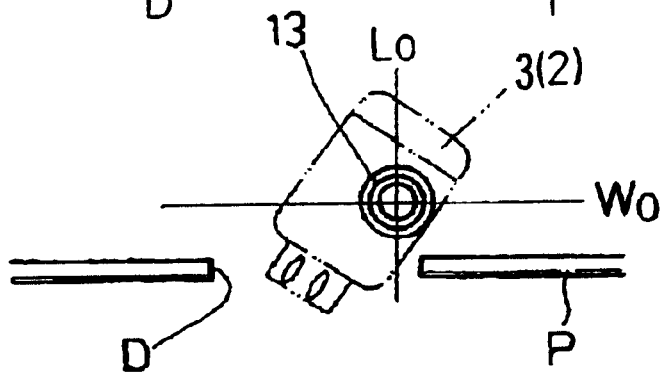
Figure 8:
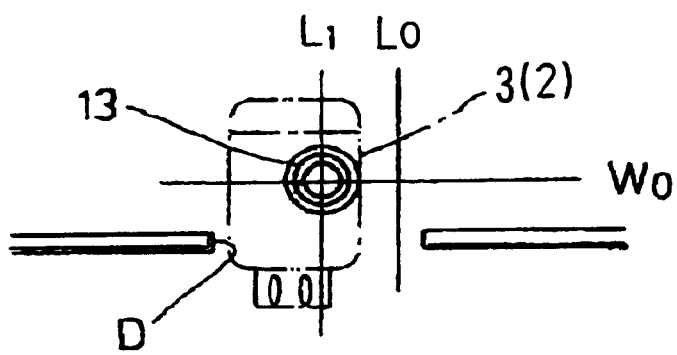
Figure 8:
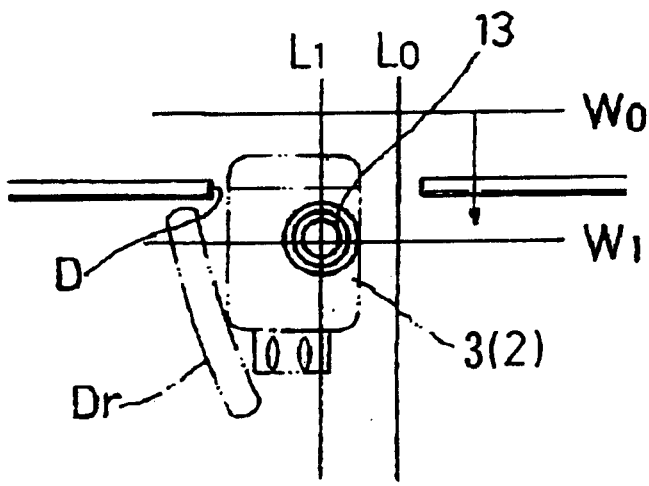

A seat driving device (driving mechanism) 40 for performing a rotating movement and a sliding movement of the seat body 2 by means of a driving force of a driving source will now be described with reference to FIGS. 6 and 7.

The seat driving device 40 is composed of an reversibly rotatable electric motor 41 used as a driving source, and a belt type power transmission mechanism 42 for transmitting the driving force of the electric motor 41 to the outer ring 13a of the rotary disc 13.

The electric motor 41 is fixed to the base 12 that is located on the front side of the rotating support base 10 directly or via a bracket (not shown). The belt type power transmission mechanism 42 is composed of a plurality of toothed belts (timing belts) 42a, 42b and 42c (three in this first representative embodiment), and a plurality of toothed pulleys 43 across which these belts 42a, 42b and 42c are stretched. The rearmost toothed belt 42c, which is the final transmission member of driving force, is stretched so as to surround a tooth 44 formed on an outer peripheral surface of the outer ring 13a of the rotary disc 13. In this case, the plurality of toothed pulleys 43 are rotatably attached to the base 12 that is a component of the rotating support base 10, via a proper bracket (not shown).

In the seat driving device 40 constructed as described above, all components are arranged so as to be set within a region of the base 31 of the longitudinal support base 30. More specifically, the seat driving device 40 is arranged by making use of a space formed between the longitudinal support base 30 and the rotating support base 10 or a space formed between the rotating support base 10 and the seat cushion 2a, and is set so as not to project from the lower surface of the seat body 2. Thus, the seat driving device 40 is covered with the seat cushion 2a, and is constructed so that a passenger or operator's hand and feet are not held; as a result, safety can be ensured.

Although a specific illustration is omitted, the electric motor 41 has a unit structure that includes a worm gearing reducing gear, and an electromagnetic clutch is attached to a distal end of an output shaft thereof. Thus, if the motor breaks down, a main switch is operated so as to turn off the electromagnetic clutch, and thus, the electric motor 41 is released from a power transmission system, so that the seat body 2 can be manually operated.

Moreover, the seat body 2 has a rotation lock mechanism (not shown) for locking, and thereby preventing, the rotating movement of the seat body 2 and a slide lock mechanism for locking, and thereby preventing, the sliding movement of the scat body 2. By these lock mechanisms, the rotating movement and the sliding movement of the seat body 2 are locked in the sitting position where the seat body 2 is directed to the front of the vehicle and the vehicle entry/exit position where it is directed to the door opening D.

The movement of the rotating vehicle seat 1 of this representative embodiment constructed as described above also will be described with reference to FIGS. 8(A) to 8(D). In the following description, a rotating part shown by an imaginary line in these figures is set as seat base 3. In these figures, on the basis of the rotating axis of the seat body 2 (rotating axis of the rotary disc 13), a backward position of a vehicle longitudinal moving range is shown by a symbol L0, and a forward position of the same is shown by a symbol L1.

FIG. 8(A) shows the seat body 2 situated in the sitting position. At this time, an operator releases the lock of the rotation lock mechanism, and thereafter, when the operator operates a switch (not shown) to drive the electric motor 41, the outer ring 13a is rotated via the belt type power transmission mechanism 42. Thus, the seat body 2 starts to rotate toward the door opening D, as described before.

FIG. 8(B) shows the seat body 2 rotated by angle of about 26° toward the vehicle entry/exit position direction. During this rotation, the pinion gear 24 and the intermediate gear 22 do not engage each other; therefore, the seat body 2 is only rotated until this point. At this step, the seat body 2 stops in a position before the seat cushion 2a interferes with a rear portion of the door opening D, that is, a rear pillar P. For this reason, if the seat body 2 is further rotated, the seat body 2 will interfere with the pillar P. As a result, it is impossible to rotate the seat body 2 into a position directed transversely with respect to the door opening D.

However, after the seat body 2 has rotated by an angle of about 26°, the pinion gear 24 starts to engage the intermediate gear 22. Thereafter, when the seat body 2 is further rotated, the seat body 2 is moved forward by engagement of the pinion gear 24 with the intermediate gear 22 and by engagement of the intermediate gear 22 with the rack 21. In this manner, the seat body 2 rotates while sliding forward throughout the interlocking region of the remaining angle of about 64°. Thus, the seat body 2 can be directed transversely with respect to the door opening D, as shown in FIG. 8(C), and is situated at the aforesaid forward position L1. Specifically, the seat body 2 is situated in the vehicle entry/exit position. As described above, the seat body 2 rotates while sliding forward. During this rotation, it is possible to avoid interference of the passenger's foot or the foot rest with the front end of the door opening D.

In the known rotating vehicle seat, when the seat body is rotated after being once moved to the forward position, the passenger's foot or another portion of the passenger's body may interfere with the front end of the door opening (body). However, according to this first representative embodiment, the seat body 2 rotates while sliding forward, and thus, it is possible to solve this problem.

In this manner, when the seat body 2 arrives at the vehicle entry/exit position, the arrival is detected by means of a vehicle entry/exit position detector such as a limit switch LS1 shown in FIG. 3, which is located on the longitudinal support base 30, and then, the electric motor 41 is stopped by the detection signal. Moreover, at the stopped position, the rotating movement and the sliding movement of the seat body 2 are locked by means of the restricting mechanisms. In the vehicle entry/exit position, by actuating the driving device of the swing type lift up mechanism 5, as shown in FIG. 8(D), the seat body 2 is moved so as to draw a circular arc from an interior position W0 to outside position W1, and thus, the passenger can get out of the vehicle.

In order to return the seat body 2 moved to the outside position W1 in the above manner to the initial (original position), the seat body 2 is first returned to the interior position W0 by reversely actuating the lift up mechanism 5. Thereafter, when a switch (not shown) is operated to reversibly drive the electric motor 41, the outer ring 13a is reversibly rotated via the belt type power transmission mechanism 42. At this time, the pinion gear 24 and the intermediate gear 22 and the intermediate gear 22 and the rack 21, respectively, are maintained in the engaged state. Therefore, the seat body 2 is rotated to the interior side conversely to the aforesaid rotation while sliding from the forward position L1 toward the backward position L0.

When the seat body 2 is rotated from the vehicle entry/exit position to the interior side by an angle of about 64°, the seat body 2 is returned to the backward position L0, and then, is situated to the position as shown in FIG. 8(B). Thereafter, when the seat body 2 is further rotated by an angle of 26°, the seat body 2 is returned to the sitting position as shown in FIG. 8(A). In the rotation range of 26°, the engagement of the pinion gear 24 with the intermediate gear 22 is released. Therefore, the seat body 2 only rotates, and does not slide in the longitudinal direction.

When the seat body 2 is moved from the vehicle entry/exit position and arrives at the sitting position, the arrival is detected by means of a sitting position detector such as a limit switch LS2 shown in FIG. 3, and then, the electric motor 41 is stopped by the detection signal. Thereafter, the rotating movement of the seat body 2 is locked by means of the lock mechanism, and thus, the seat body 2 can be fixed in the sitting position.

In the rotating seat 1 of this first representative embodiment, the seat body 2 is supported on the rotating support base 10 and the longitudinal support base 30, and the pinion gear 24 and the rack 21, which are engaged with each other via the intermediate gear 22, are interposed between the seat body 2 and the longitudinal support base 30. Thus, the rotating movement of the seat body 2 is interlocked with the sliding movement thereof. For example, even if the door opening D is narrow like the case of a sedan type passenger car, it is possible to direct the seat body 2 to the door opening D side by using a rotating movement without interfering with other portions such as a pillar and the passenger's feet interfering with the end portion of the door opening portion D. Therefore, seat body 2 has several advantageous over the known vehicle seats.

In this first representative embodiment, the rotating movement and the sliding movement of the seat body 2, which are interlocked in the aforesaid manner, are provided by means of the seat driving mechanism 40 using the electric motor 41 as a driving source. Thus, it is possible to reduce the operator's load as compared with the known manual type rotating seat.

In this case, the seat driving mechanism 40 moves integrally with the rotating support base 10, and thus, it is possible to perform the rotating movement and the sliding movement of the seat body 2 by only the rotational movement. Further, a belt type power transmission mechanism is employed as the power transmission mechanism 42. Thus, it is possible to consider a layout by taking advantage of the flexibility of the belt, and to effectively use a narrow space without interfering with other passengers or items located around the seat.

Moreover, the rotary disc 13 is attached to the end portion on the outside of the seat, and thus, a large space is secured on the lower surface on the interior side of the seat. This serves to attach the pinion gear 24, which has a large diameter. As the diameter of the pinion gear 24 becomes larger, a longer longitudinal moving distance of the seat body 2 can be set. Therefore, in particular, the rotating seat 1 is preferably applicable to a one box car that requires a relatively long longitudinal moving distance. Further, the rotating axis is set to the outside of a hip point HP, and therefore, by only rotating the seat body 2 to the outside, it is possible to move the seat body 2 to the vehicle forward direction. Thus, it is possible to secure a long moving distance in the longitudinal direction.

In addition, in order to move the seat body 2 in the longitudinal direction of the vehicle, a linear guide mechanism 34 is used. The linear guide mechanism 34 is composed of the movable retaining member 11, the stationary retaining member 32 and a plurality of bearings 33 held between groove portions 11a and 32a formed in these members. Thus, it is possible to smoothly move the seat body 2 in the longitudinal direction without rattling. If a roller is rolled on a U-shaped rail, it is necessary to define a proper clearance between the roller and the rail in order to smoothly move the seat body 2. This clearance factor may generate rattling in the seat body 2. However, the above linear guide mechanism 34 does not suffer from this problem, and it is possible to provide a rotating seat 1 having a very high support stiffness (no rattling or vibration).

In the aforesaid electric motor type rotating vehicle seat of this first representative embodiment, the belt type power transmission mechanism 42 was used as the seat driving mechanism 40 for driving the seat body 2. In the seat driving mechanism 40, the following various modifications may be considered. In each modification example, the mechanism for making the rotating movement and the sliding movement of the seat body 2 and the mechanism for making both movements together have the same construction as the above representative embodiment, except the seat driving mechanism 40 has been modified. Therefore, for the elements shown in figures, like reference numerals are used to designate the same elements as the above representative embodiment, and details concerning such like elements can be omitted.

Figure 9:
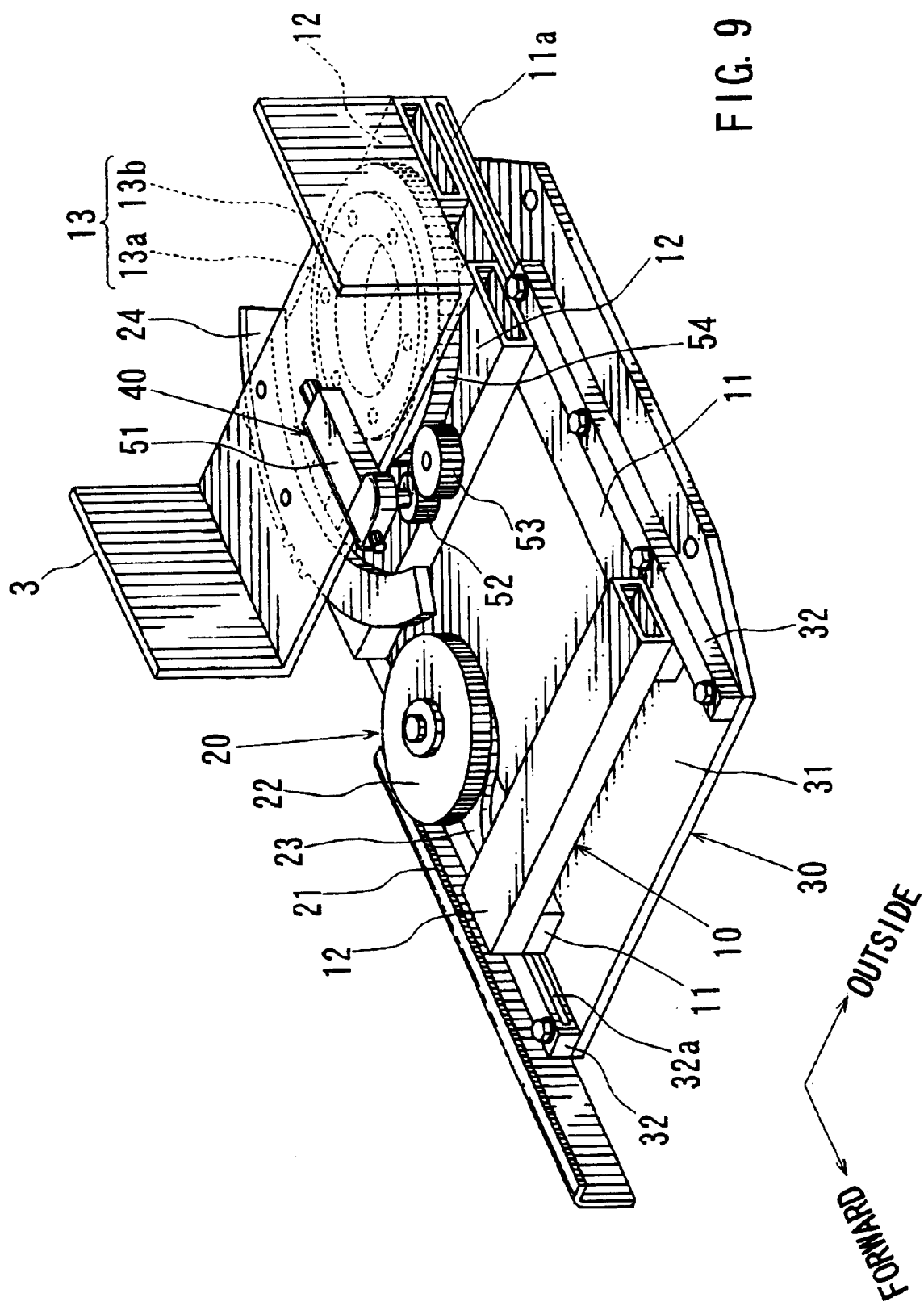
FIG. 9 is a perspective view showing a driving mechanism according to a second representative embodiment.
Figure 10:
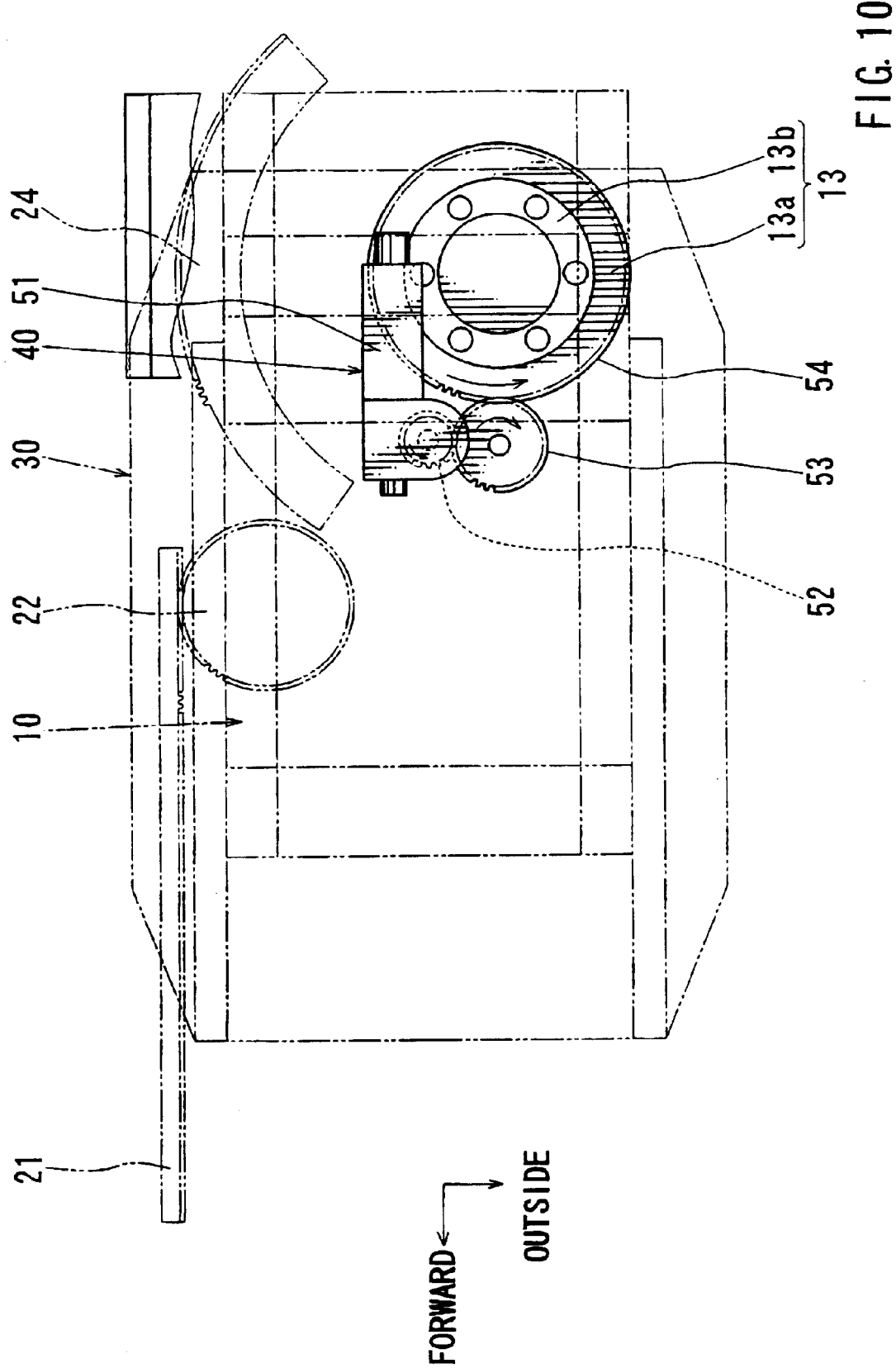
FIG. 10 is a top plan view showing the driving mechanism according to the second representative embodiment.

FIGS. 9 and 10 show a second representative embodiment. In this second representative embodiment, the outer ring 13a of the rotary disc 13 is fixed to the rotating support base 10 and the inner ring 13b thereof is fixed to the seat base 3 that supports the seat body 2.

A reversibly rotatable electric motor 51 having the same construction as the above first representative embodiment is used as a driving source of the seat driving mechanism 40, and a gear train is used as a power transmission mechanism. More specifically, the electric motor 51 is placed on the upper surface of the seat base 3 that supports the seat body 2 at the central portion thereof directly or via a bracket. A driving gear 52 located on an output shaft of the electric motor 51 is engaged with a driven gear 54 located on an outer periphery of the outer ring 13a via a reduction gear 53. In this case, the reduction gear 53 is rotatably attached to the seat base 3 via a bracket (not shown).

The seat driving mechanism 40 constructed as described above is arranged on the lower surface of the seat cushion 2a of the seat body 2 attached onto the seat base 3. Therefore, it is possible to prevent a passenger or operator from being caught in the seat driving mechanism 40 during its rotation.

In the above second representative embodiment, when the electric motor 51 is driven, the rotating force is transmitted to the outer ring 13a via the gear train 52 to 54. A reaction force rotates the seat base 3 and the seat body 2 because the outer ring 13a is fixed to the rotating support base 10. More specifically, in this second representative embodiment, the seat driving mechanism 40 is integrally rotated around the outer ring 13a with the seat base 3. Thus, the seat body 2 rotates and slides in the longitudinal direction via the same rotation/slide interlocking mechanism 20 as the above first representative embodiment, and thus, the seat body 2 is movable between the sitting position and the vehicle entry/exit position.

By using the aforesaid gear train, the seat driving mechanism 40 can be compact and it is possible to readily assemble the seat driving mechanism into a narrow space.

Figure 11:
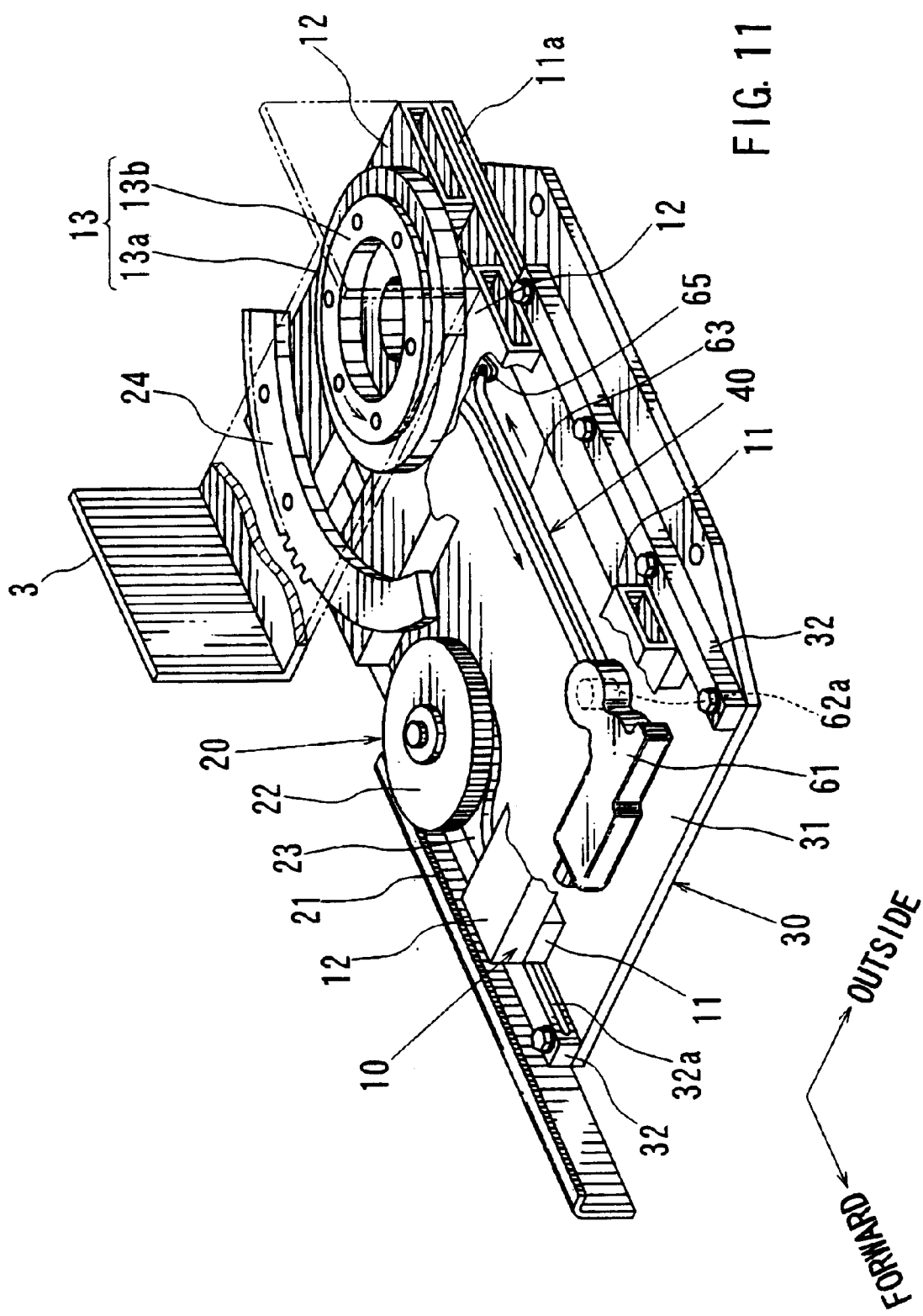
FIG. 11 is a perspective view showing a driving mechanism according to a third representative embodiment.
Figure 12:
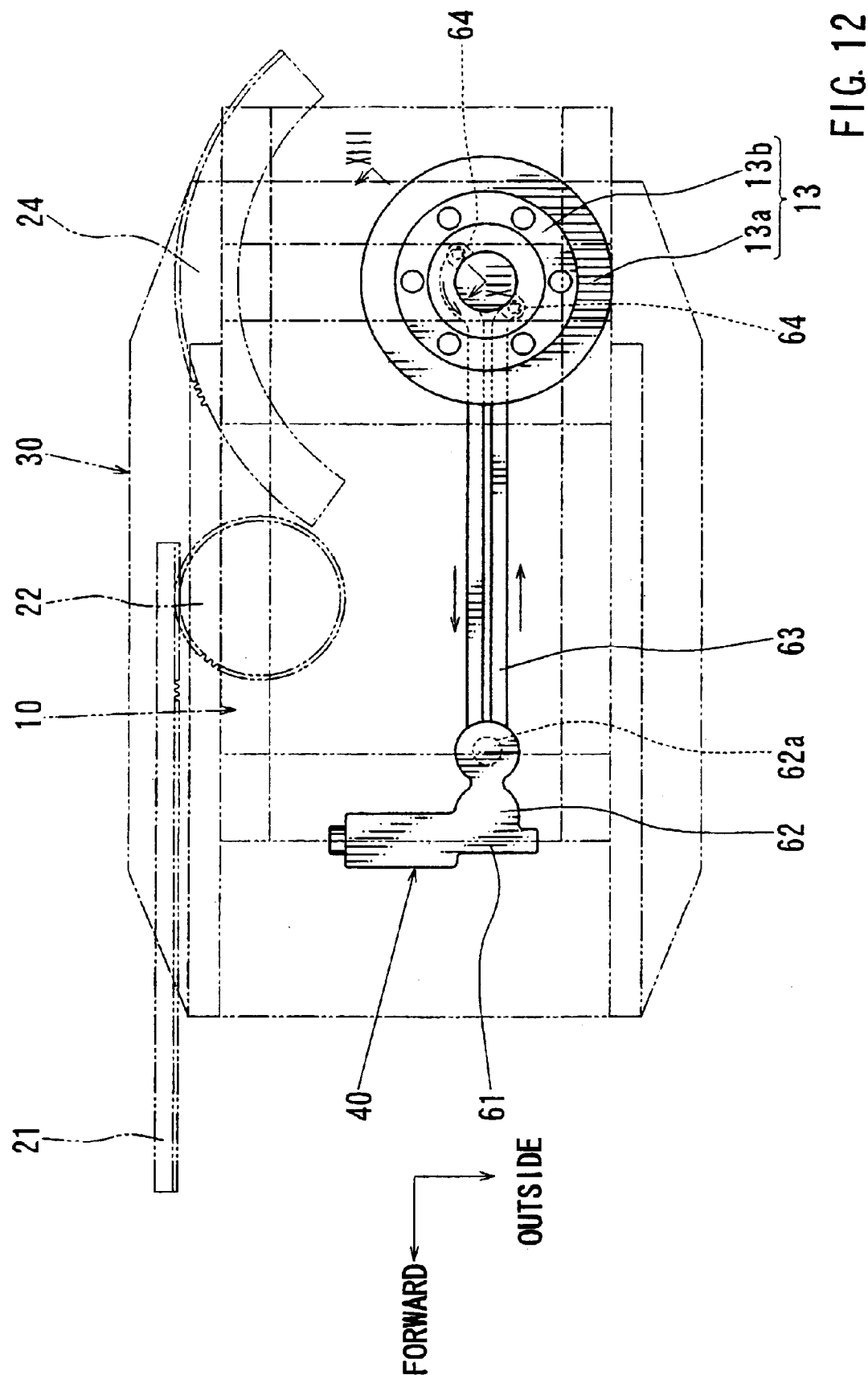
FIG. 12 is a top plan view showing the driving mechanism according to the third representative embodiment.
Figure 13:
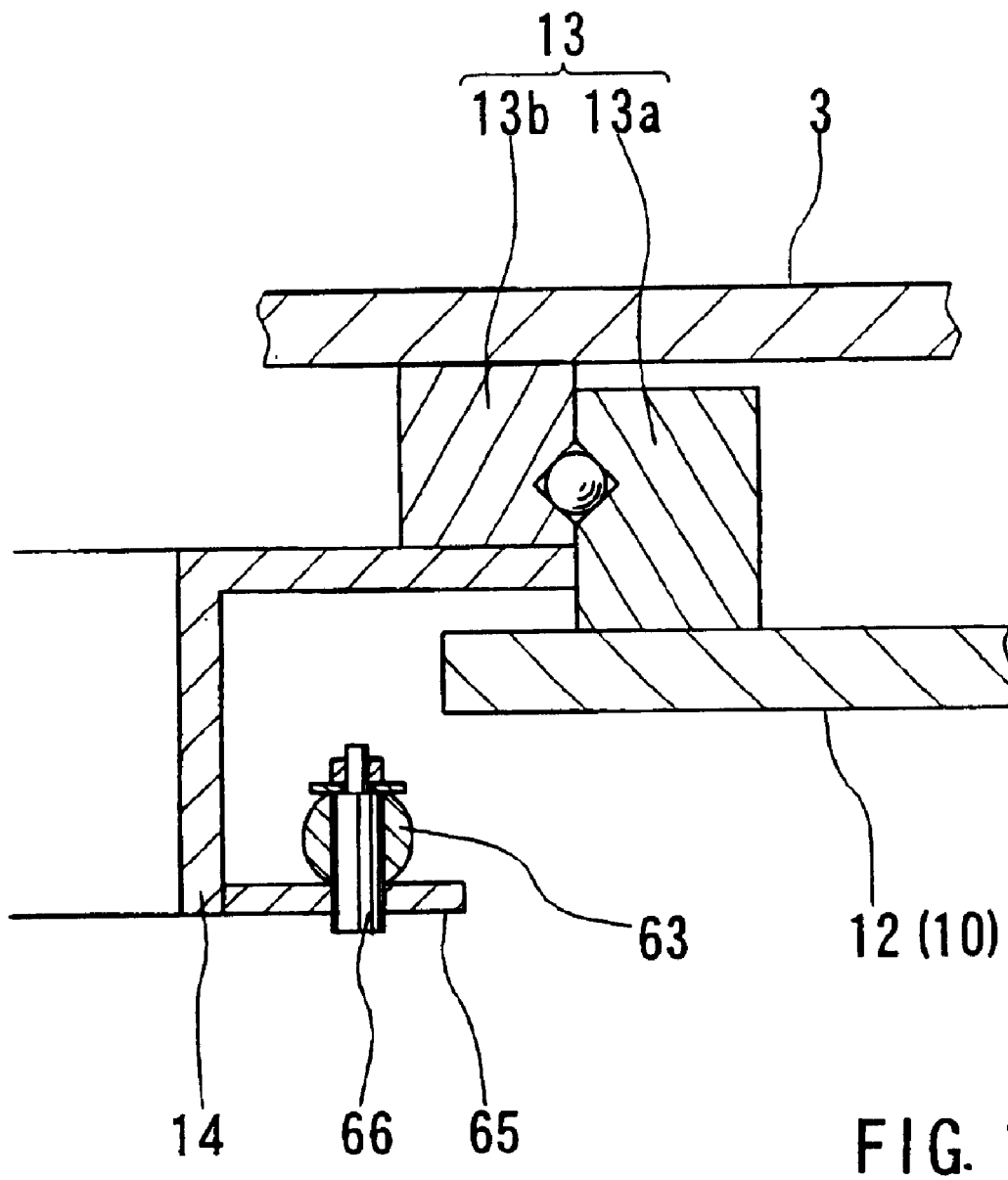
FIG. 13 is a cross sectional view cut along the line XIII—XIII of FIG. 12.

A third representative embodiment of the seat driving mechanism 40 win now be described with reference to FIGS. 11 to 13. In this third representative embodiment, the outer ring 13a of the rotary disc 13 is fixed onto the base 12 of the rotating support base 10, and the inner ring 13b thereof is fixed onto the seat base 3 that supports the seat body 2. Further, pushing or pulling an arm 65 located on the inner ring 13b rotates the seat body 2.

More specifically, the inner ring 13b is provided with a cylindrical member 14 that downwardly projects between the intermediate and rear bases 12, at its bottom surface side. An outer peripheral surface of the cylindrical member 14 is provided with two arms 65 that project outwardly and horizontally and that are arranged in a substantially symmetrical position around the rotating axis. On the other hand, the front base 12 of the rotating support base 10 is provided with a gear assembly 62 that is driven by an electric motor 61. Then, a geared cable 63 is wound around a driving gear 62a of the gear assembly 62, and its both end portions are connected to the two arms 65 so as to be rotatable by means of a pin 66.

In this case, the geared cable 63 is constructed in a manner of spirally winding a wire around an outer periphery of a strand wire. When the electric motor 61 is driven, the spiral wire is engaged with the driving gear 62a for reciprocating movement. The seat driving mechanism 40 constructed as described above is arranged on the lower surface of the seat body 2 so as to be covered. The remaining construction is the same as the above representative embodiment.

In this third representative embodiment, when the electric motor 61 is driven, one geared cable 63 is forwardly pulled out by rotation of the driving gear 62a; the other geared cable 63 is backwardly pushed out. Thus, pulling and pushing the geared cable 63 rotate the inner ring 13b rotated in a clockwise or counterclockwise direction via the arm 65.

Therefore, the seat base 3 fixed onto the inner ring 13b and the seat body are rotated while sliding in the longitudinal direction via the rotation/slide interlocking mechanism 20. Specifically, in the case of the third representative embodiment, the seat driving mechanism 40 moves integrally with the rotating support base 10. Thus, it is possible to perform a rotating movement and a sliding movement of the seat body 2 by only a rotational movement, as was the case in the first representative embodiment.

Figure 14:
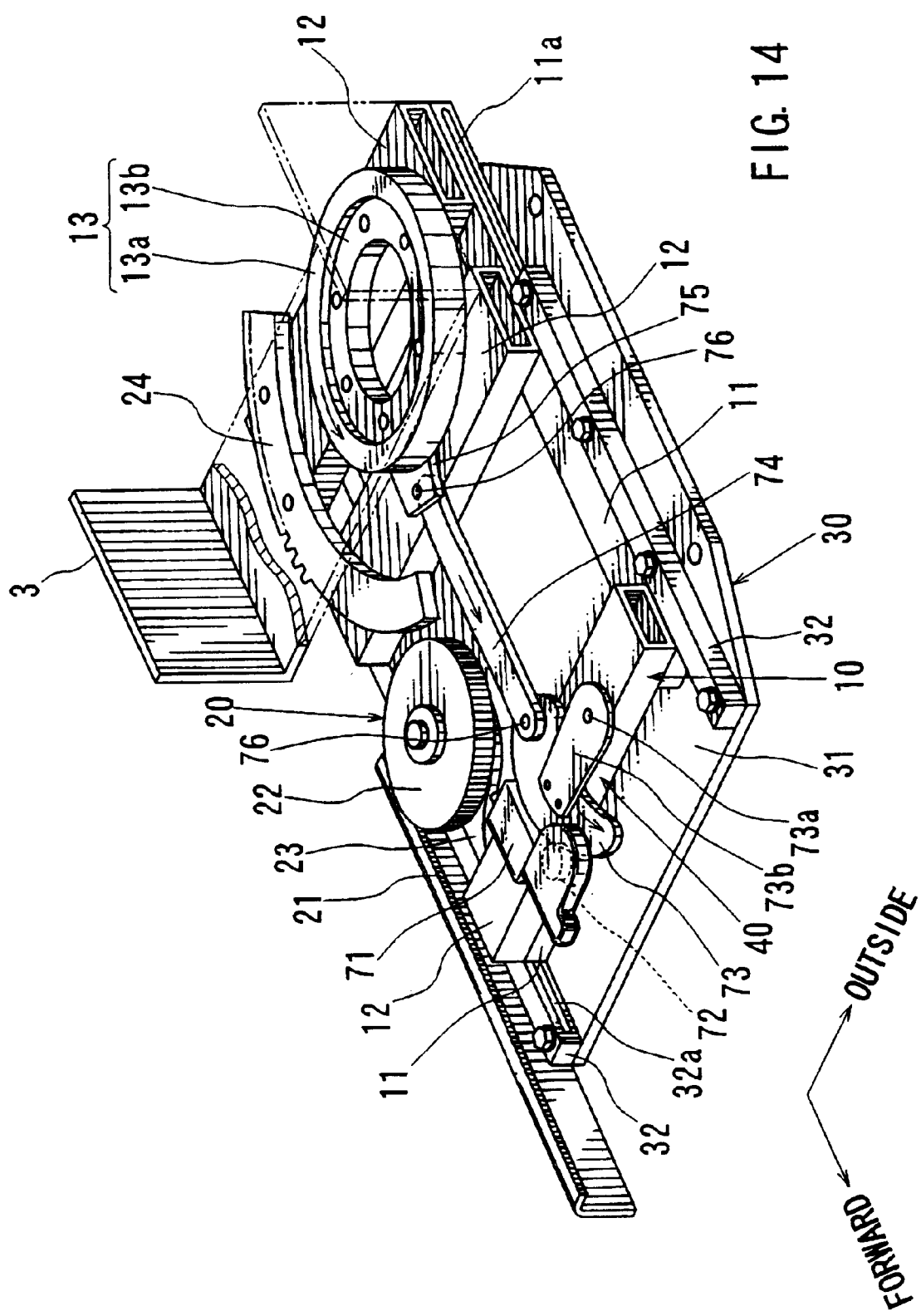
FIG. 14 is a perspective view showing a driving mechanism according to a fourth representative embodiment.

A fourth representative embodiment of the seat driving mechanism 40 will now be described with reference to FIGS. 14 to 16. This fourth representative embodiment is similar to the above third representative embodiment in that pushing and pulling the arm rotatably drives the rotary disc 13. In this fourth representative embodiment, the inner ring 13b of the rotary disc 13 is fixed onto the rotating support base 10, and the outer ring 13a thereof is fixed onto the seat base 3 that supports the seat body 2. Further, the outer ring 13a is provided with an arm 75 that outwardly and horizontally projects.

On the other hand, a reversibly rotatable electric motor 71, which has the same construction as the above representative embodiment, is attached to the front-side base 12 of the rotating support base 10 directly or via a bracket. Further, a circular arc-like driven gear 73 is attached to the front-side base 12 of the rotating support base 10 for horizontal rotation and is engaged with a driving gear 72 attached on an output shaft of the electric motor 71. The driven gear 73 and the arm 75 are connected to each other by means of a link 74.

Figure 15:
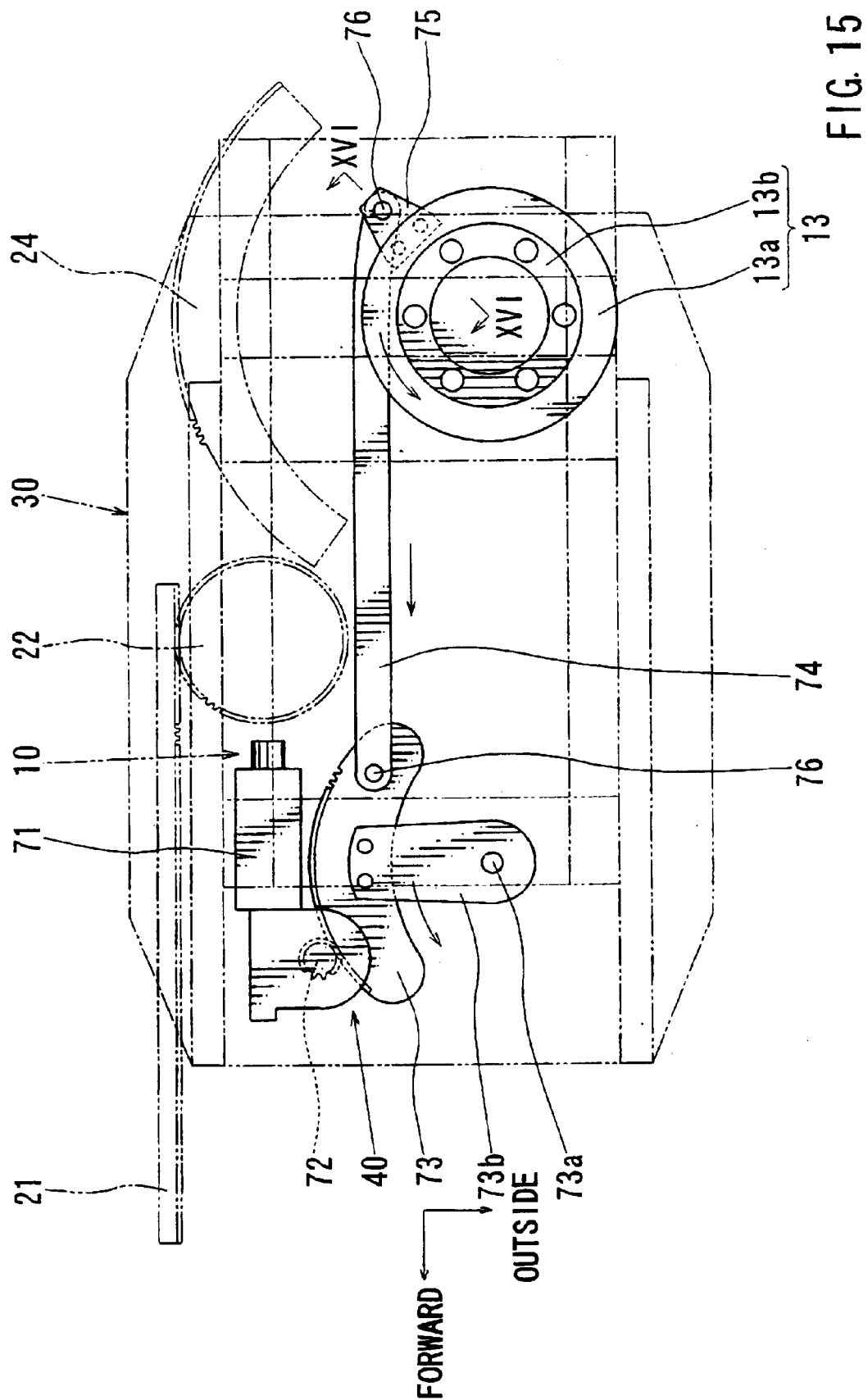
FIG. 15 is a top plan view showing the driving mechanism according to the fourth representative embodiment.
Figure 16:
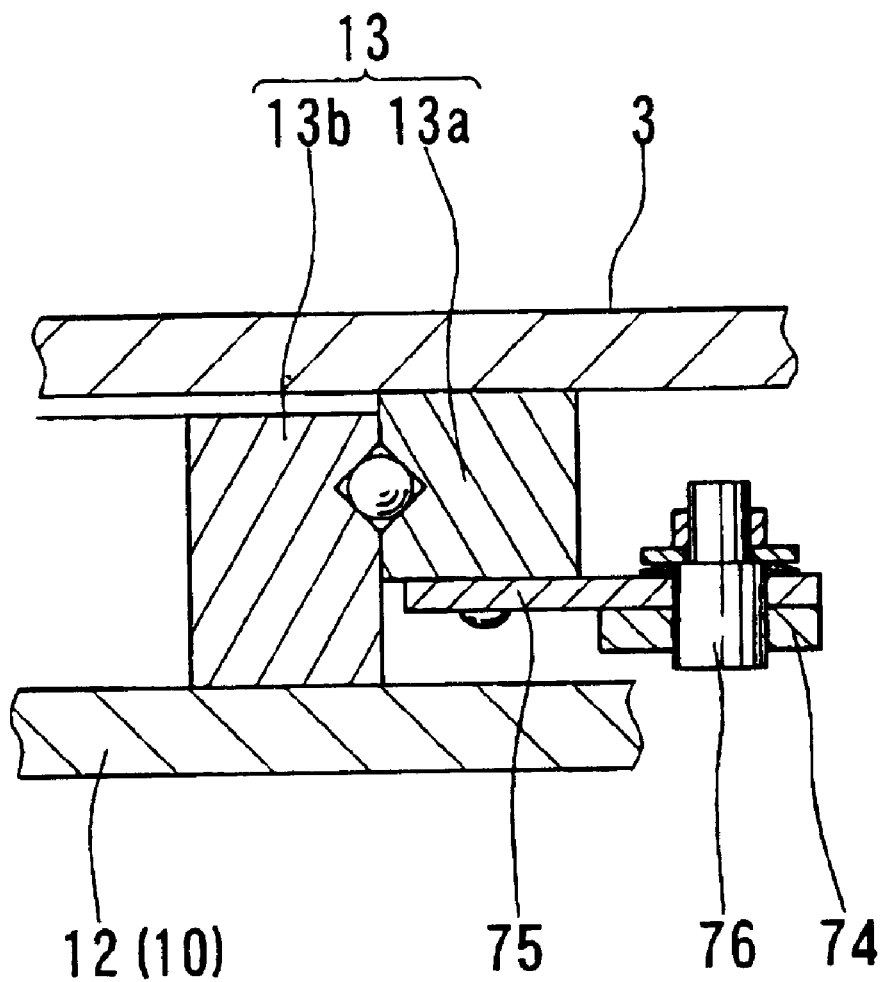
FIG. 16 is a cross sectional view cut along the line XVI—XVI of FIG. 15.

As shown in FIG. 15, the driven gear 73 is connected to an arm 73b that is rotatable around a supporting shaft 73a projected from the base 12, by means of a bolt, a rivet or the like. The link 74 is rotatably connected to each of the driven gear 73 and the arm 75 by means of a pin 76. The seat driving mechanism 40 constructed as described above is arranged in the lower surface of the seat body 2 so as to be covered. The remaining construction is the same as the above representative embodiment.

In this fourth representative embodiment, when the electric motor 71 is driven, the Link 74 is moved and displaced by the rotation of the driven gear 73 and the driving gear 72 in the longitudinal direction so as to forwardly pull the arm 75 or backwardly push it. Thus, the outer ring 13a is rotated in a clockwise or counterclockwise direction.

Therefore, the seat base 3 fixed onto the inner ring 13b and the seat body 2 are rotated while sliding in the longitudinal direction via the rotation/slide interlocking mechanism 20. Specifically, in the case of this fourth representative embodiment, the seat driving mechanism 40 moves integrally with the rotating support base 10. Thus, it is possible to perform a rotating movement and a sliding movement of the seat body 2 by only a rotational movement, as was the case in the first representative embodiment.

Figure 17:
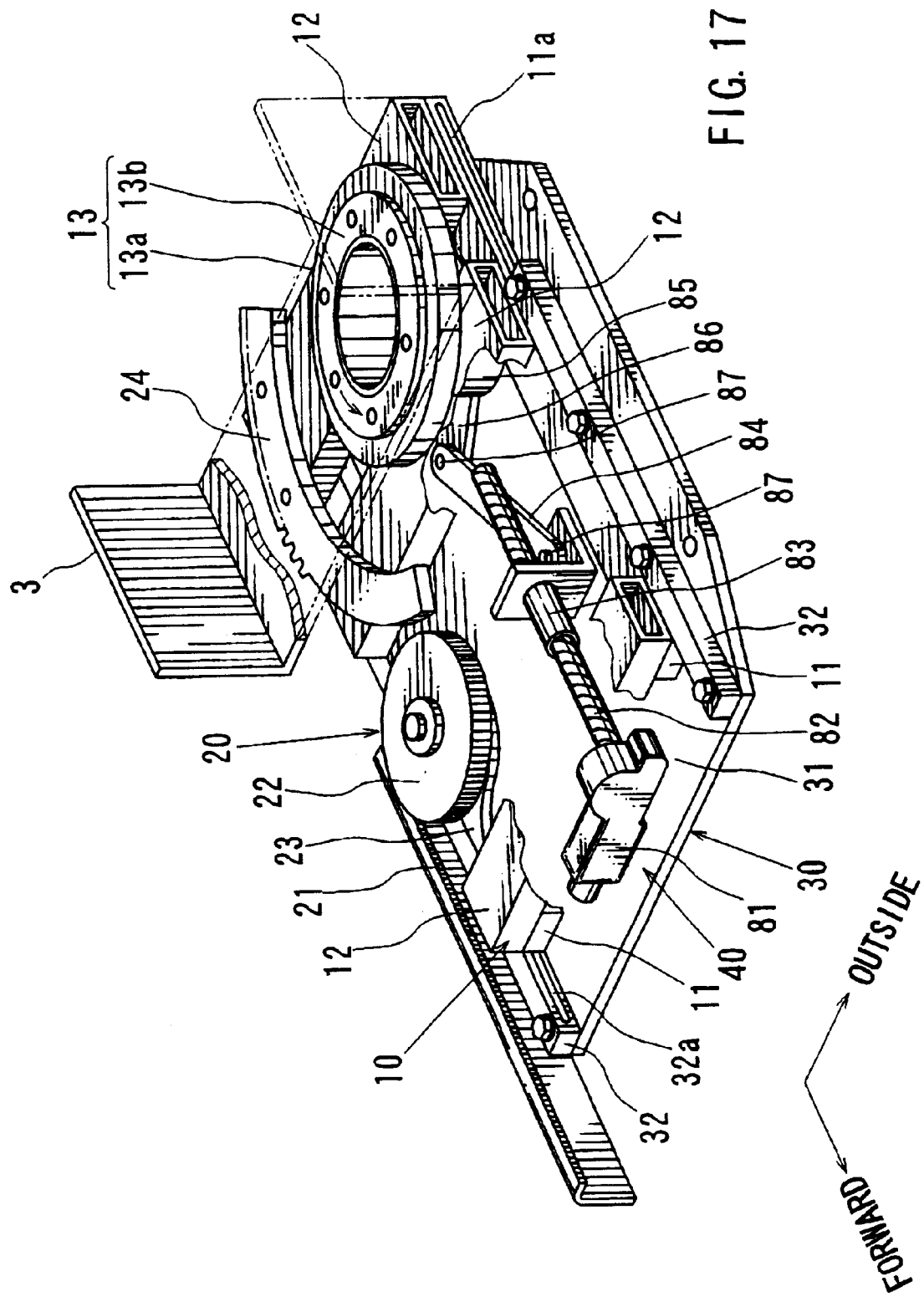
FIG. 17 is a perspective view showing a driving mechanism according to a fifth representative embodiment.
Figure 18:
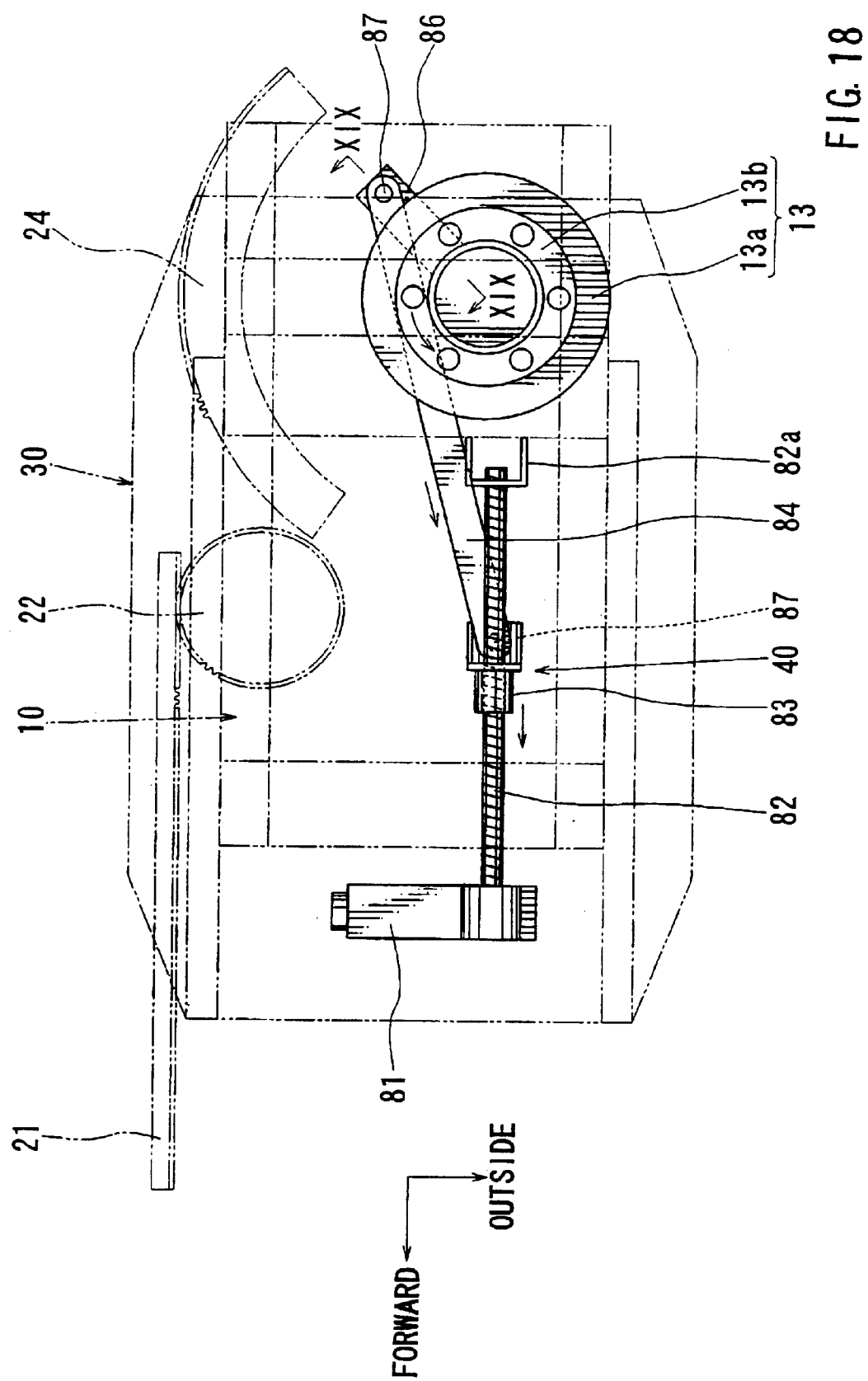
FIG. 18 is a top plan view showing the driving mechanism according to the fifth representative embodiment.
Figure 19:
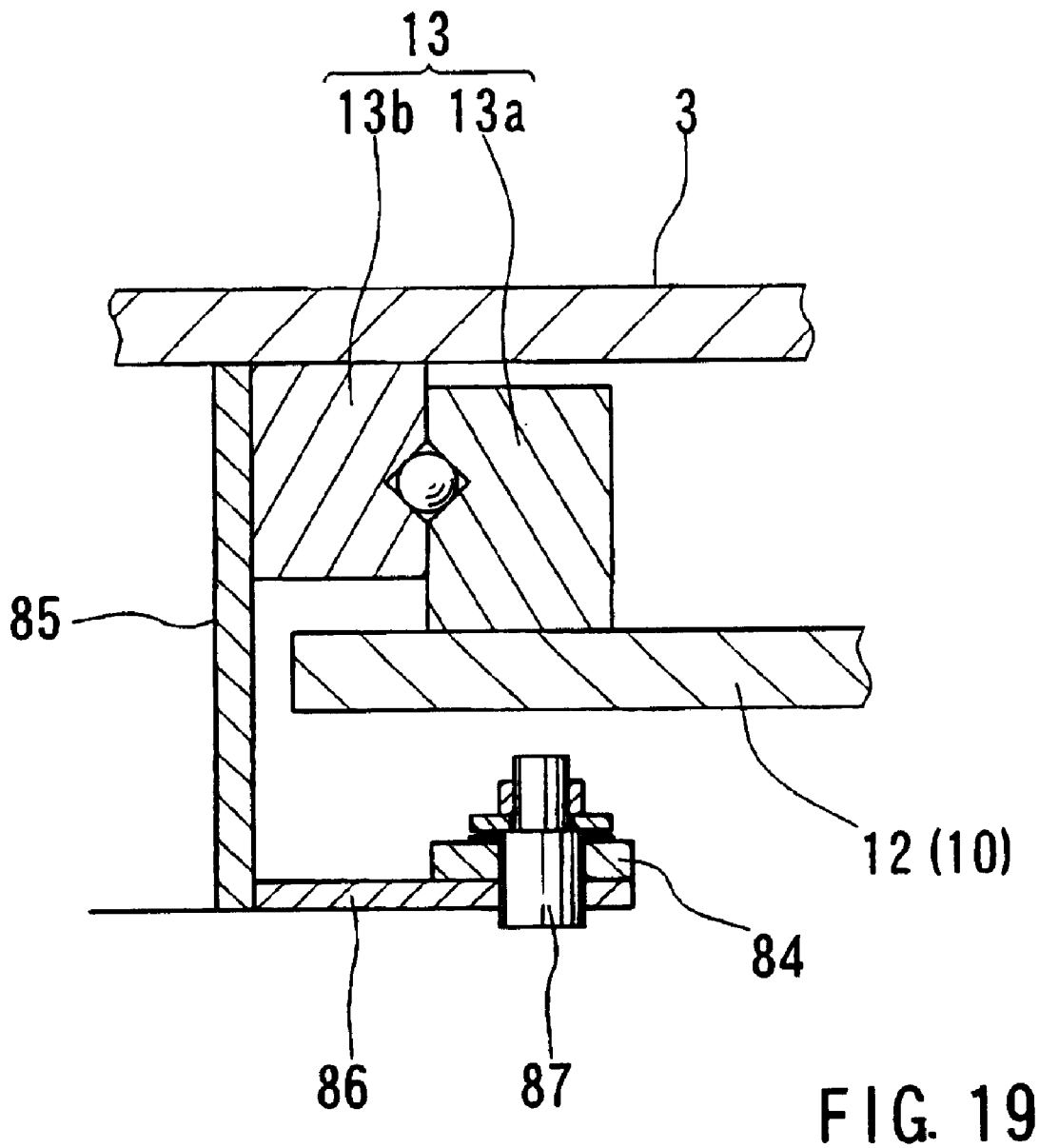
FIG. 19 is a cross sectional view cut along the line XIX—XIX of FIG. 18.

A fifth representative embodiment of the seat driving mechanism 40 will be described with reference to FIGS. 17 to 19. This fifth representative embodiment is similar to the above fourth representative embodiment in that pushing and pulling the arm rotatably drives the rotary disc 13. In this fifth representative embodiment, the outer ring 13a of the rotary disc 13 is fixed onto the rotating support base 10, and the inner ring 13b thereof is fixed onto the seat base 3 that supports the seat body 2. As shown in FIG. 19, the inner ring 13b is provided with a cylindrical member 85 that outwardly and horizontally projects between the intermediate and rear bases 12, at its bottom surface side. A lower end portion of the cylindrical member 14 is provided with an arm 86 that projects outwardly and horizontally projects.

On the other hand, an electric motor 81 having the same construction as the above representative embodiment is fixed onto the front-side base 12 directly or a bracket. A ball screw 82 that is rotated by the electric motor 81 is arranged in a direction parallel with the sliding direction of the rotating support base 10. A ball nut 83 that is screwed onto the ball screw 82 and the arm 86 are connected to each other by means of a link 84. In this case, the ball screw 82 is rotatably attached to the base 12 via a bracket 82a (see FIG. 18). The link 84 is rotatably connected to each of the ball nut 83 and the arm 86 by means of a pin 87. The seat driving mechanism 40 constructed as described above is arranged in the lower surface of the seat body 2 so as to be covered. The remaining construction is the same as the above representative embodiment.

In this fifth representative embodiment, when the electric motor 81 is driven to rotate the ball screw 82 in a right or left direction, the ball nut 83 is moved forwardly or backwardly, and thus, the arm 86 is forwardly pulled or is backwardly pushed via the link 84. Thus, the inner ring 13b is rotated in a clockwise or counterclockwise direction.

Therefore, the seat base 3 fixed onto the inner ring 13b and the seat body 2 are rotated while sliding in the longitudinal direction via the rotation/slide interlocking mechanism 20. Specifically, in the case of this fifth representative embodiment, the seat driving mechanism 40 is moved integrally with the rotating support base 10. Thus, it is possible to perform a rotating movement and a sliding movement of the seat body 2 by only a rotational movement, as was the case in the first representative embodiment.

Figure 20:
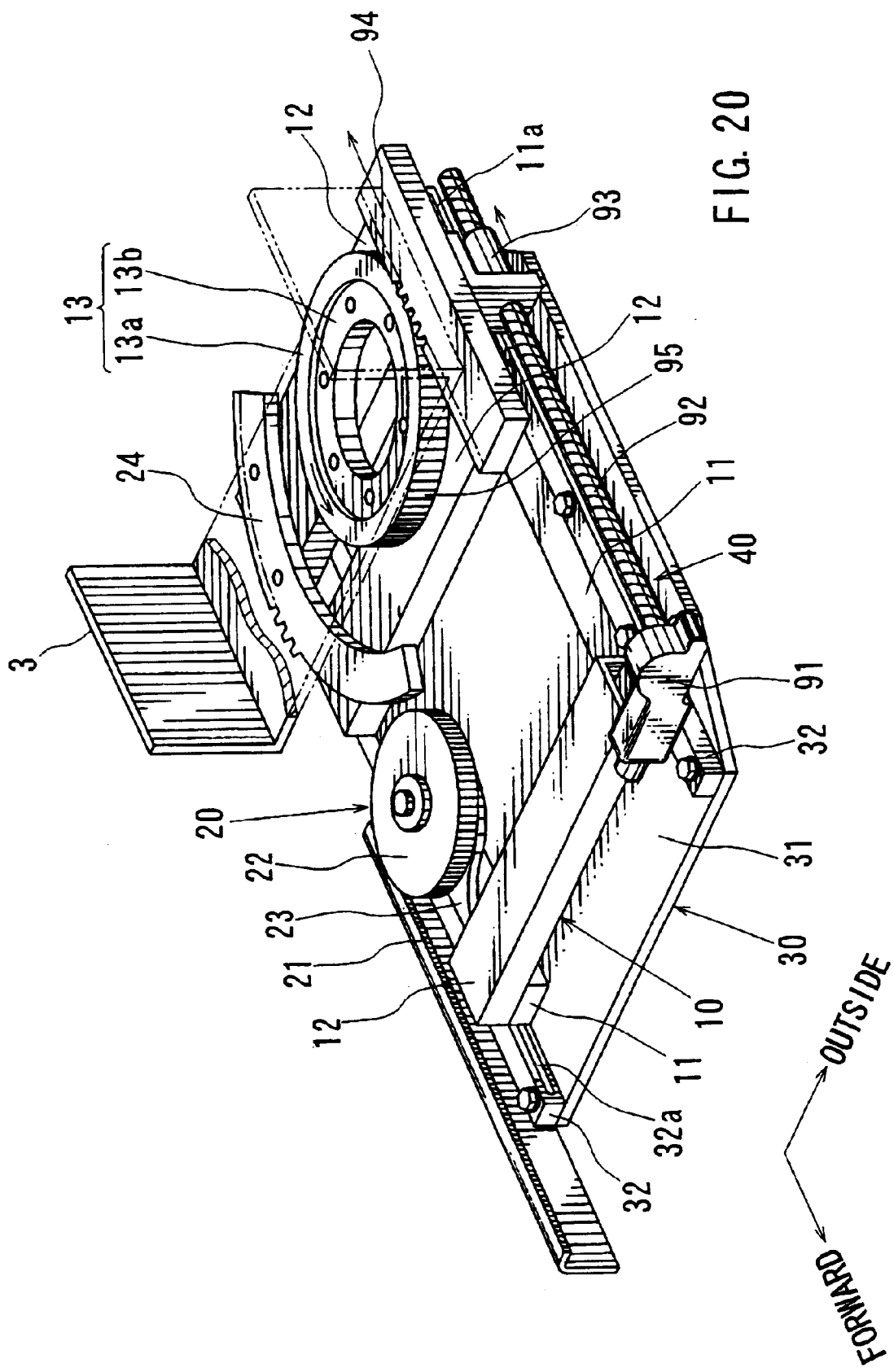
FIG. 20 is a perspective view showing a driving mechanism according to a sixth representative embodiment.
Figure 21:
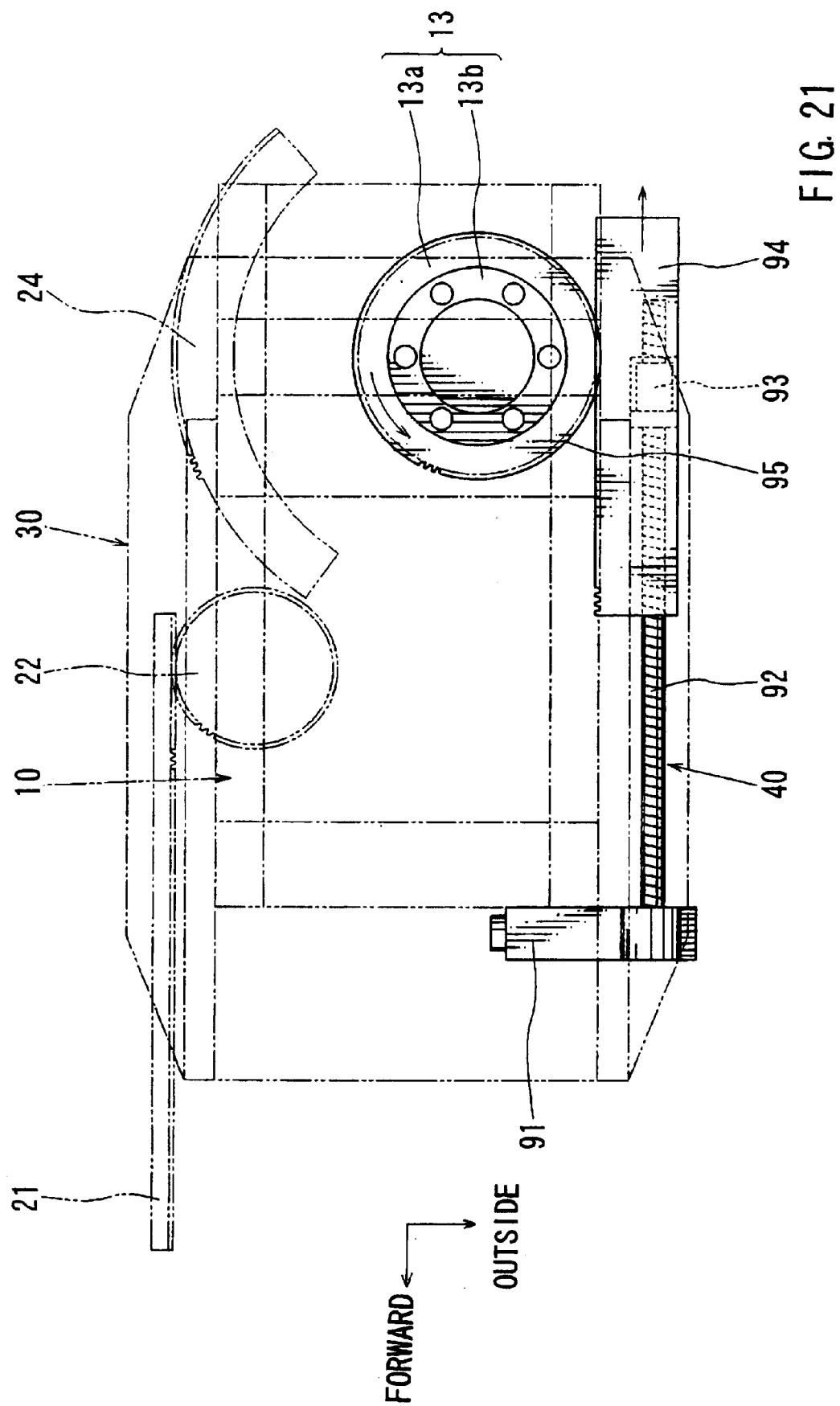
FIG. 21 is a top plan view showing the driving mechanism according to the sixth representative embodiment.

A sixth representative embodiment of the seat driving mechanism 40 will now be described with reference to FIGS. 20 and 21. In this sixth representative embodiment, the inner ring 13b of the rotary disc 13 is fixed onto the rotating support base 10, and the outer ring 13a thereof is fixed onto the seat base 3 that supports the seat body 2. An electric motor 91 having the same construction as the above representative embodiment is fixed to the front-side base 12 directly or via a bracket. A ball screw 92 that is rotated by the electric motor 91 is arranged in a direction parallel with the sliding direction of the rotating support base 10. A ball nut 93 is screwed onto the ball screw 92, and includes a rack 94 that is engaged with a gear 95 formed on an outer periphery of the outer ring 13a. The seat driving mechanism 40 constructed as described above is arranged in the lower surface of the seat body 2 so as to be covered thereby. The remaining construction is the same as the above representative embodiment. In this case, it is desirable that the rotating support base 10 is provided with a guide for smoothly moving the rack 94.

In this sixth representative embodiment, when the electric motor 91 is driven to rotate the ball screw 92 in a right or left direction, the ball nut 93 and the rack 94 fixed to the ball nut 93 are moved forwardly or backwardly. Thus, the rack 94 and the gear 95 engaging with the rack 94 are integrally moved, and thus, the outer ring 13a is rotated in a clockwise or counterclockwise direction.

Therefore, the seat base 3 fixed onto the outer ring 13a and the seat body 2 are rotated while sliding in the longitudinal direction via the rotation/slide interlocking mechanism 20. Specifically, in the case of this sixth representative embodiment, the seat driving mechanism 40 is moved integrally with the rotating support base 10, and thus, it is possible to perform a rotating movement and a sliding movement of the seat body 2 by only a rotational movement, like the case of the above representative embodiment.

The aforesaid first to sixth representative embodiments all show examples in which the seat driving mechanism 40 is located on the front side of the rotary disc 13. The following representative embodiments each show examples in which the seat driving mechanism 40 is located on the rear side of the rotary disc 13, and the seat base 3 is not illustrated.

Figure 22:
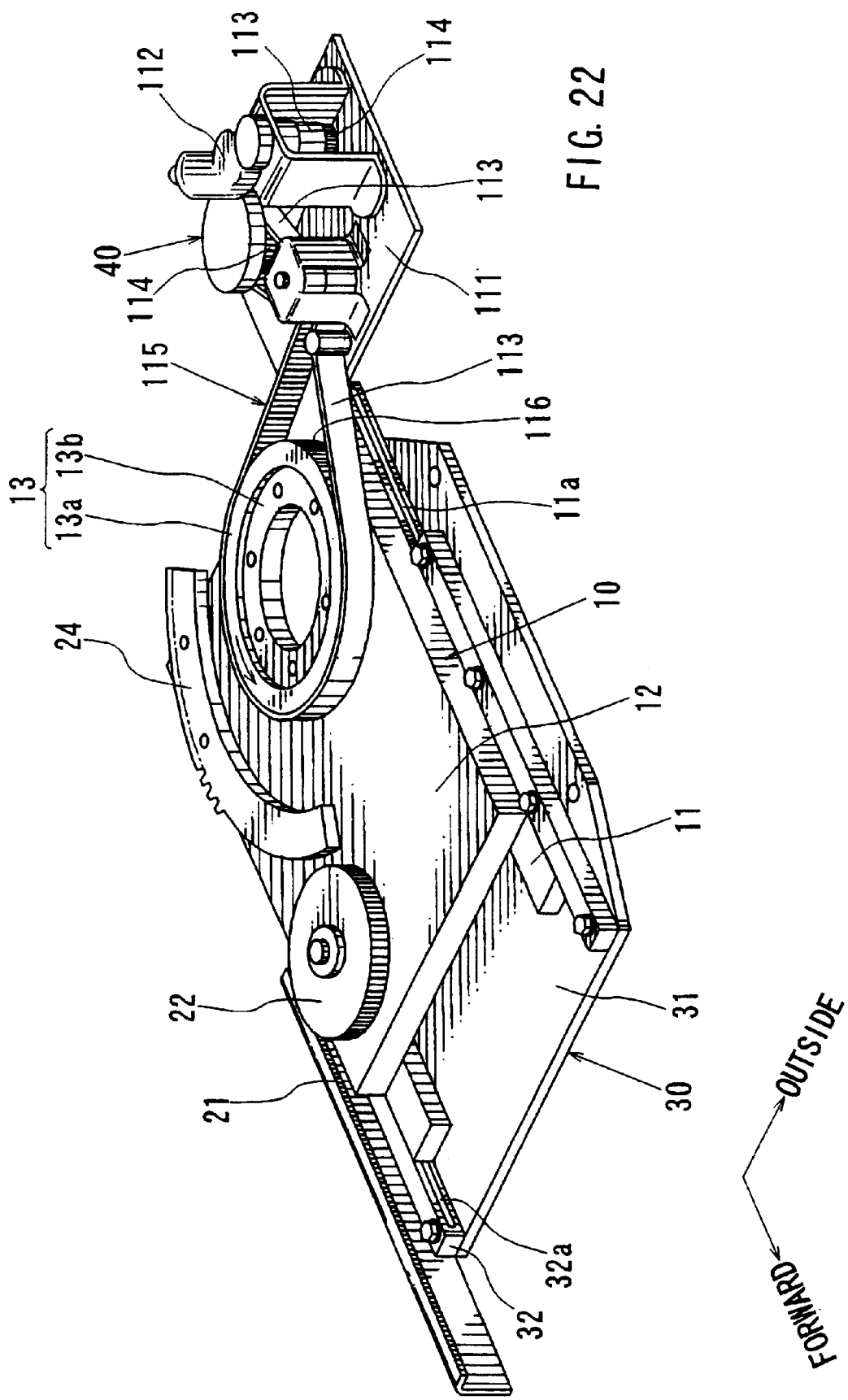
FIG. 22 is a perspective view showing a driving mechanism according to a seventh representative embodiment.

FIG. 22 shows a seventh representative embodiment. In this seventh representative embodiment, the inner ring 13b of the rotary disc 13 is fixed onto the rotating support base 10, and the outer ring thereof 13a is fixed onto the seat base 3 that supports the seat body 2. As shown in FIG. 22, a belt drive type seat driving mechanism 40 is provided, which is the same as the seat driving mechanism 40 described in the above representative embodiment.

More specifically, a rear end portion of the rotating support base 10 is provided with an elongation plate 111 that extends backwardly. The elongation plate 111 is provided with a reversibly rotatable electric motor 112 that is used as a driving source, and a belt drive type power transmission mechanism 115 that is composed of a plurality (three) of toothed belts 113 and a plurality of toothed pulleys 114. The final transmission toothed belt 113 is wound around a gear 116 located on the outer ring 13a. The seat driving mechanism 40 constructed as described above is arranged in the lower surface of the seat body 2 so as to be covered, and therefore, it is possible to prevent a passenger from being caught in the seat driving mechanism 40 during its rotation. The remaining construction is the same as the above representative embodiment.

Therefore, in the case of this seventh representative embodiment, the seat driving mechanism 40 is moved integrally with the rotating support base 10, and thus, it is possible to perform a rotating movement and a sliding movement of the seat body 2 by only a rotational movement, like the case of the above representative embodiment.

Figure 23:
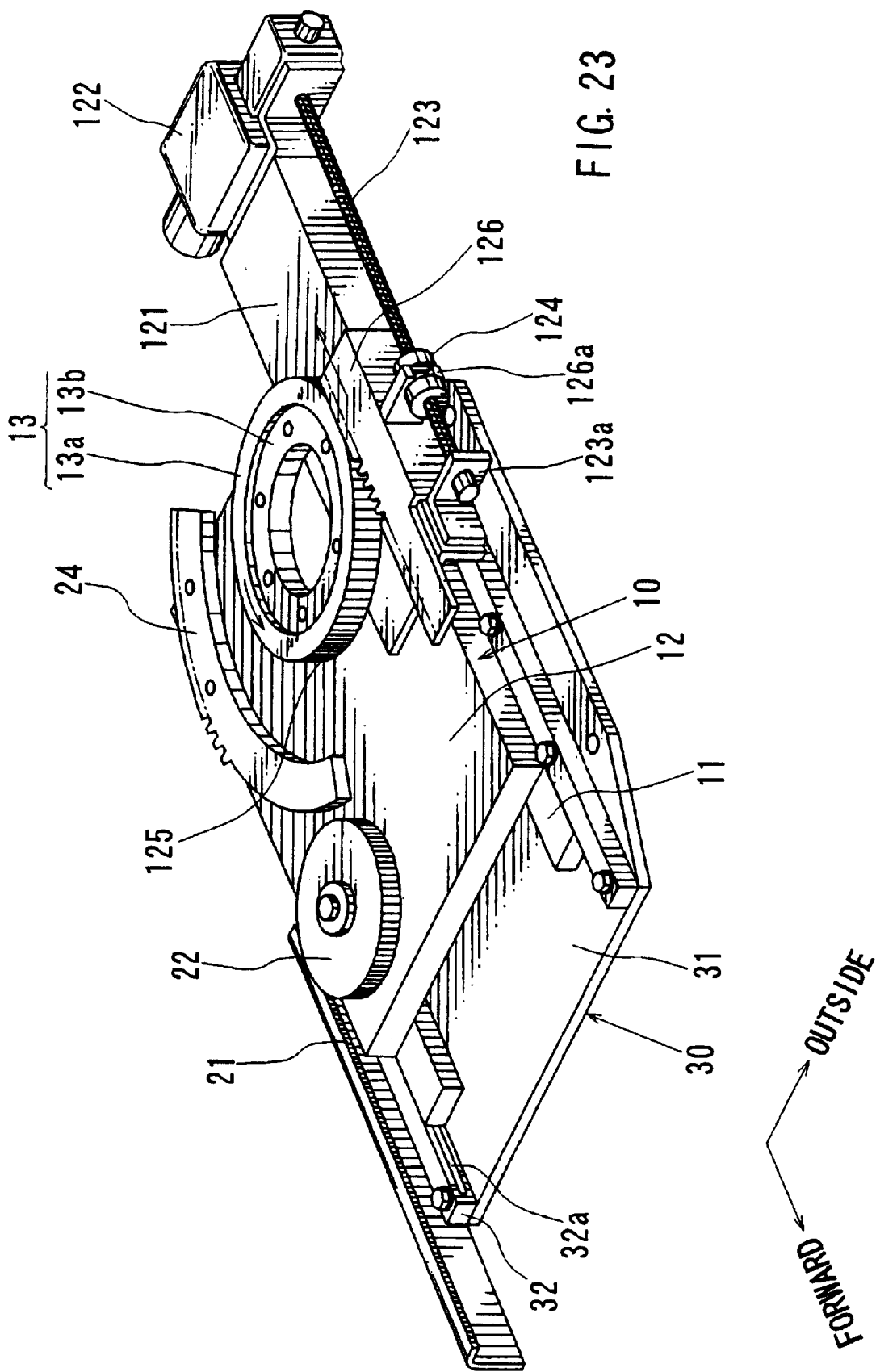
FIG. 23 is a perspective view showing the driving mechanism according to an eighth representative embodiment.

FIG. 23 shows an eighth representative embodiment of the seat driving mechanism 40. In this eighth representative embodiment, the inner ring 13b of the rotary disc 13 is fixed onto the rotating support base 10, and the outer ring 13a thereof is fixed onto the seat base 3 that supports the seat body 2. This eighth representative embodiment has the same construction as the sixth representative embodiment except that an electric motor 122 is arranged on a rear side of the rotary disc 13.

More specifically, a rear end portion of the rotating support base 10 is provided with an extension plate 121. The extension plate 121 is provided with a reversibly rotatable electric motor 122 having the same construction as the above representative embodiment. A ball screw 123, which is rotatably driven by means of the electric motor 122, is arranged in parallel with a sliding direction of the rotating support base 10 and is supported by means of a bracket 123a. A ball nut 124 is screwed into the ball screw 123, and an outer peripheral concave (recess) portion of the ball nut 124 is fitted with a forked click (pawl) 126a of a rack 126 that is engaged with a gear 125 located on an outer periphery of the outer ring 13a. The seat driving mechanism 40 constructed as described above is arranged on the lower surface of the seat body 2 so as to be covered thereby, and therefore, it is possible to prevent a passenger from being caught in the scat driving mechanism 40 during its rotation. The remaining construction is the same as the above representative embodiment.

Therefore, in the case of this eighth representative embodiment, when the electric motor 122 is driven to rotate the ball screw 123 in a right or left direction, the rack 126 engaging with the gear 125 is moved forwardly or backwardly together with the ball nut 124, and thus, the outer ring 13a is rotated. For this reason, the seat base 3 fixed to the outer ring 13a and the seat body 2 are rotated, and then, is slid in the longitudinal direction via the rotation/slide interlocking mechanism 20. Specifically, the seat driving mechanism 40 is moved integrally with the rotating support base 10, and thus, it is possible to perform a rotating movement and a sliding movement of the seat body 2 by only a rotational movement, like the case of the above sixth representative embodiment.

Figure 24:
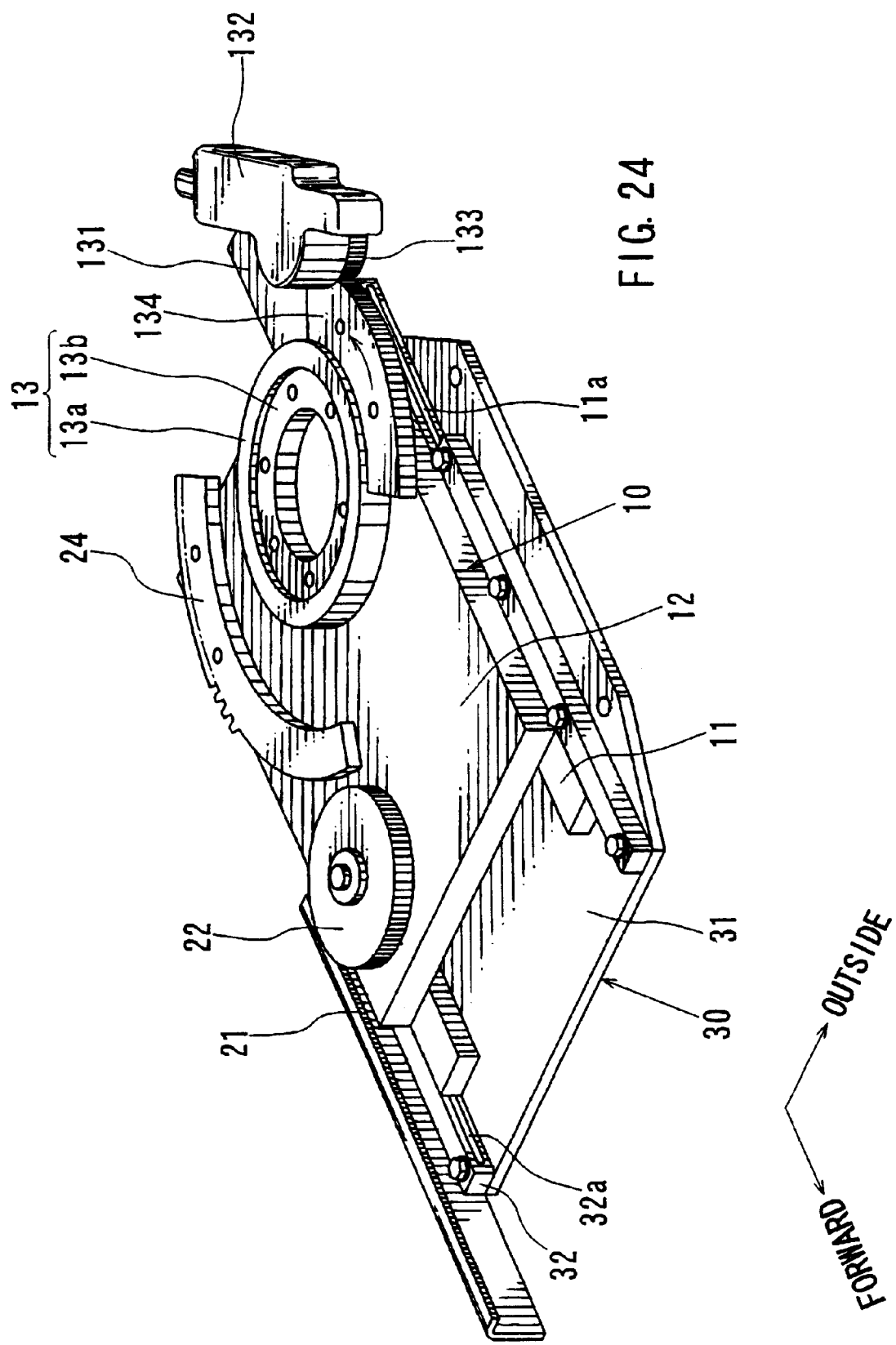
FIG. 24 is a perspective view showing a driving mechanism according to a ninth representative embodiment.

FIG. 24 shows a ninth representative embodiment of the seat driving mechanism 40. In this ninth representative embodiment, the inner ring 13b of the rotary disc 13 is fixed onto the rotating support base 10, and the outer ring 13a thereof is fixed onto the seat base 3 that supports the seat body 2. In this ninth representative embodiment, an electric motor 132 having the same construction as the above representative embodiment is provided on an elongation plate 131 located on the rear portion of the rotating support base 10.

A driving gear 133 located on an output shaft of the electric motor 132 is engaged with a sector driven gear 134 located at the lower surface of the seat base 3. The seat driving mechanism 40 constructed as described above is arranged in the lower surface of the scat body 2 so as to be covered thereby, and therefore, it is possible to prevent a passenger from being caught in the seat driving mechanism 40 during its rotation. The remaining construction is the same as the above representative embodiment.

Therefore, in the ninth representative embodiment, when the electric motor 132 is driven, the driven gear 134 is rotated in a right or left direction via the driving gear 133. Thus, the seat base 3 fixed onto the driven gear 134 and the seat body 2 are rotated, and then, are slid in the longitudinal direction via the rotation/slide interlocking mechanism 20. Specifically, the seat driving mechanism 40 is moved integrally with the rotating support base 10, and thus, it is possible to perform a rotating movement and a sliding movement of the seat body 2 by only a rotational movement.

Figure 25:
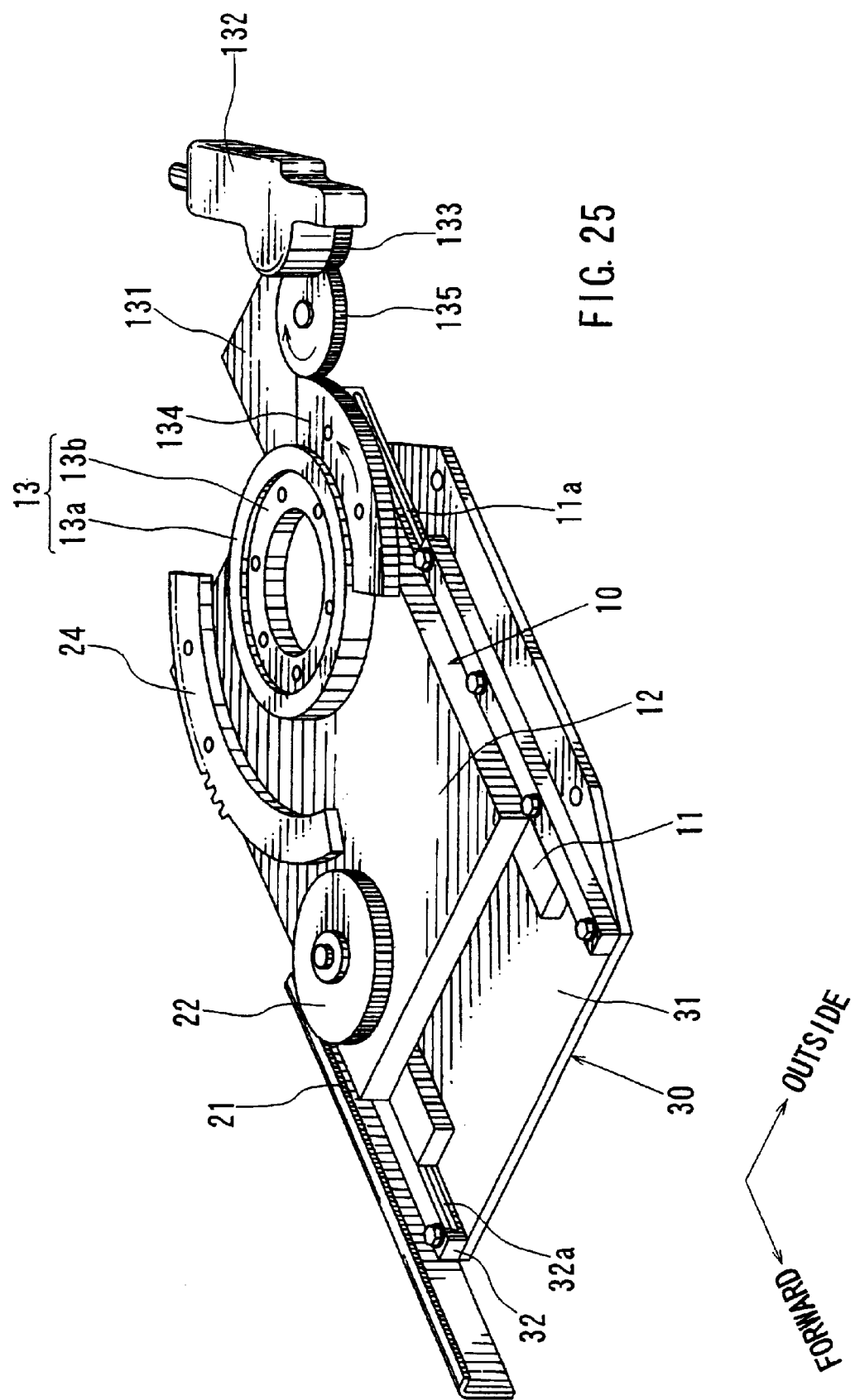
FIG. 25 is a perspective view showing the driving mechanism according to a tenth representative embodiment.

In the above ninth representative embodiment, the following modification is possible. A reduction gear 135 may be interposed between the driving gear 133 and the driven gear 134, as a tenth representative embodiment shown in FIG. 25.

Although not illustrated, the driven gear 134 is not provided as an independent member, and the outer periphery of the outer ring 13a may be constructed as a driven gear.

Figure 26:
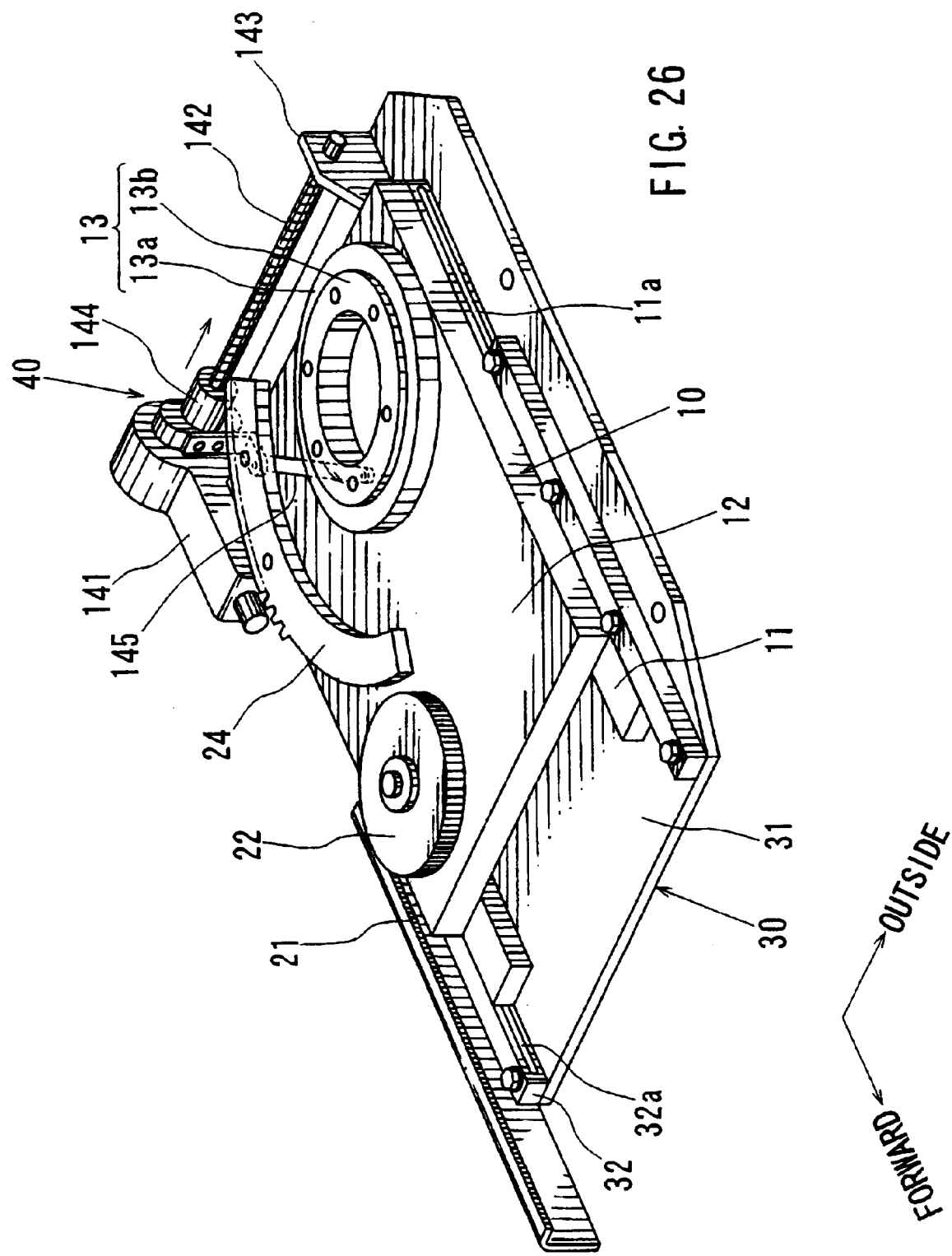
FIG. 26 is a perspective view showing the driving mechanism according to an eleventh representative embodiment.
Figure 27:
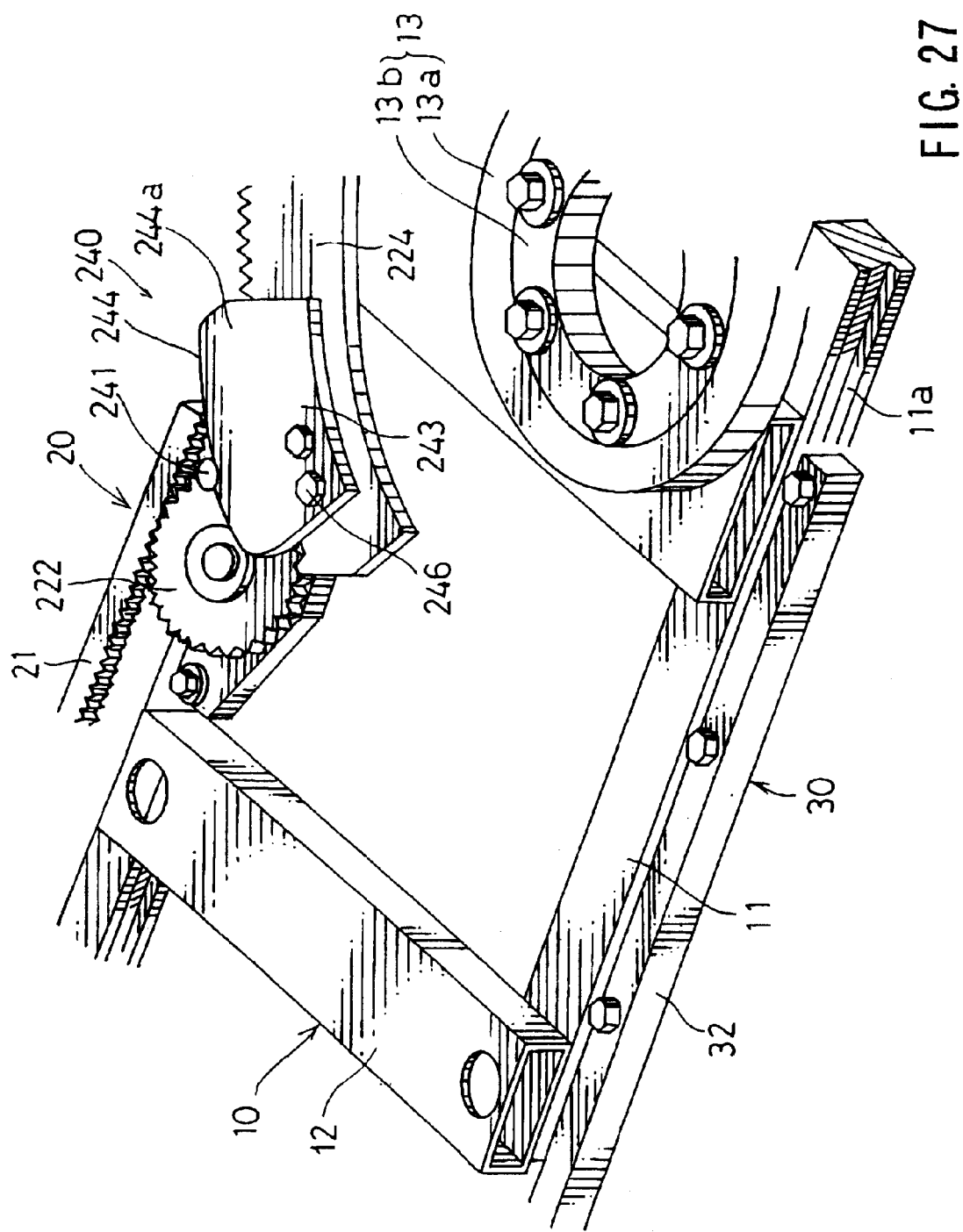
FIG. 27 is a perspective view showing a first representative embodiment of a slide lock mechanism that can be used with the rotating vehicle seat.

FIG. 26 shows an eleventh representative embodiment of the seat driving mechanism 40. This eleventh representative embodiment is a modification of the above fifth representative embodiment. In this eleventh representative embodiment, the outer ring 13a of the rotary disc 13 is fixed onto the rotating support base 10, and the inner ring 13b thereof is fixed onto the scat base 3 that supports the seat body 2.

The rear end portion of the rotating support base 10 is provided with a reversibly rotatable electric motor 141 having the same construction as the above representative embodiment. A ball screw 142 rotated by the electric motor 141 is arranged in a direction perpendicular to the moving direction of the rotating support base 10, that is, along a width direction of the vehicle. The ball screw 142 is rotatably supported by means of a bracket 143. A ball nut 144 is screwed into the ball screw 142 and is connected to the inner ring 13b via a link 145.

In this case, the inner ring 13b and the link 145 are connected to each other in a manner that the inner ring 13b is provided with a cylindrical member downwardly projecting and the link is rotatably attached to the lower surface of the cylindrical member via a pin. The seat driving mechanism 40 constructed as described above is arranged in the lower surface of the seat body 2 so as to be covered thereby, and therefore, it is possible to prevent a passenger from being caught in the seat driving mechanism 40 during its rotation. The remaining construction is the same as the above representative embodiment.

Therefore, in the eleventh representative embodiment, when the electric motor 141 is driven so as to rotate the ball screw 142 in a right or left direction, the inner ring 13b is rotated in a clockwise or counterclockwise direction via the link 145 together with the movement of the ball nut 144. Thus, the seat base 3 fixed onto the inner ring 13b and the seat body 2 are rotated, and then, are slid in the longitudinal direction via the rotation/slide interlocking mechanism 20. Specifically, in the case of the eleventh representative embodiment, the seat driving mechanism 40 is moved integrally with the rotating support base 10, and thus, it is possible to perform a rotating movement and a sliding movement of the seat body 2 by only a rotational movement.

By the way, in the aforesaid rotating vehicle seat, if the seat is rotated from the sitting position to the vehicle entry/exit position or if it is rotated in a direction reverse to the above rotation, during the moving process, a solely rotating region is provided where the seat is only rotated, in addition to an interlocking region where the seat is rotated and slid. The solely rotating region is extremely effective in avoiding an interference of a passenger's foot with a body (pillar) in a limited narrow space.

Thus, the rotation/slide interlocking mechanism 20 is composed of the rack 21 including the intermediate gear 22 and the pinion gear 24. However, in the rotation/slide interlocking mechanism 20, the possibility exists that a shift is generated in an engaging position of the pinion gear 24 and the intermediate gear 22 in the solely rotating region of the seat. For this reason, for example, a slide lock device (restricting mechanism) may be required to fix the rotating support base 10 in a predetermined position for the duration of a transfer from the start of the rotating movement to the interlocking region.

In this case, the slide lock device is constructed in a manner that a lock pin for holding a position is hooked on the longitudinal support base 30 that is used as a stationary base for supporting the rotating support base 10 so as to slide from the rotating support base 10. Also, a cam is provided in a lower surface of the seat base 3 that is used as a rotary base for supporting the seat body 2. Then, the lock pin is inserted into or removed from a lock hole of the stationary base by means of the cam so as to provide a lock state or an unlock state. Employment of the aforesaid slide lock device can be considered.

However, in the case of the lock pin insert/removal type slide lock device, the lock and unlock motion is required to be performed within an extremely small dimensional range of the final end portion of solely rotating region. Moreover, the lock pin is inserted removed in the range of rotation; for this reason, a pin hole diameter must be set larger than the pin diameter to some degree. Thus, variations can be easily generated in a relative position of the intermediate gear and the pinion gear in the sliding direction; as a result, the possibility exists that a tooth skipping phenomenon or tooth interference or the like is caused.

In order to solve the above problem, the rotating vehicle seat may have two regions, that is, a single rotation region and an interlocking region, that includes a slide lock device 240 of the rotation/slide interlocking mechanism 20, which can smoothly transfer to the interlocking region without generating a tooth skipping phenomenon during the change from the solely rotating region to the interlocking region, and has a high reliability.

A first representative embodiment of the slide lock device 240 will be described below with reference to FIGS. 27 to 30, which each show the slide lock device 240.

The slide lock device 240 locks and thereby prevents the sliding movement of the rotating support base 10 in the solely rotating region of the seat base 3, and then, releases (unlocks) the locked state when the seat base transfers from the solely rotating region to the interlocking region, and thus, makes a proper engagement of the intermediate gear 22 with the pinion gear 24.

Further, the slide lock device 240 is composed of a guide roller 241 that is located on a circumference of the intermediate gear 222, and a restricting cam 243 that is fixed on a pinion gear 224. The guide roller 241 is rolled along a cam surface 244 formed on the restricting cam 243. Further, the guide roller 241 is rotatably attached to a vertical shaft 242 that stands on an upper surface of the outermost side on the circumference of the intermediate gear 222. On the other hand, the restricting cam 243 is fixed to an upper surface of the pinion gear 224 by means of a fixing bolt 246 via a spacer 245. In this case, an attachment hole 243*a* of the restricting cam 243 is formed into a slot so that the guide roller 241 can be smoothly rolled along the cam surface 244.

Figure 28:
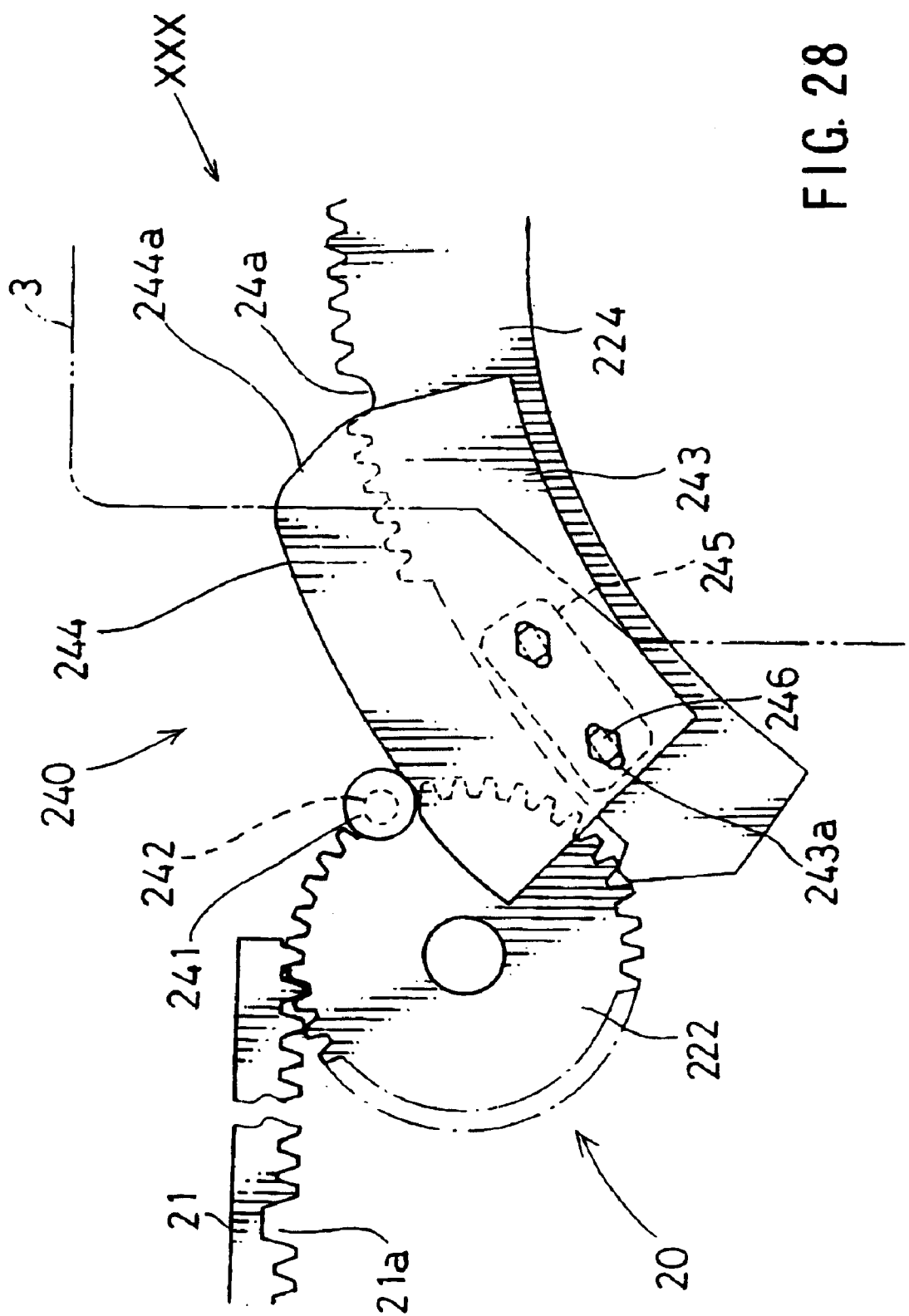
FIG. 28 is a top plan view showing a first representative embodiment of the slide lock mechanism used in the rotating vehicle seat at the state that the seat body is in the sitting position.
Figure 29:
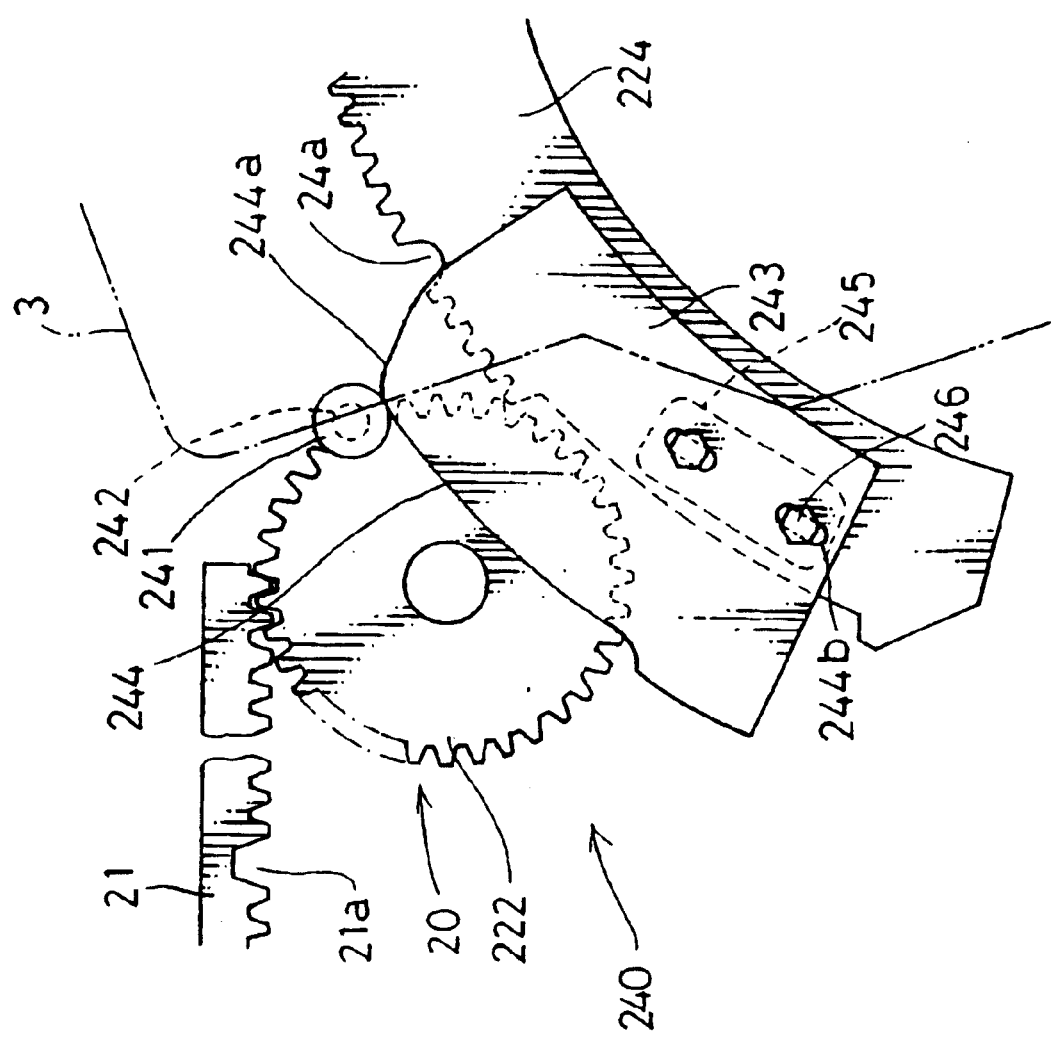
FIG. 29 is a top plan view showing a first representative embodiment of the slide lock mechanism used in the rotating vehicle seat according to the first representative embodiment at the state that the position of the seat body is changed from a solely rotating region to an interlocking region.
Figure 30:
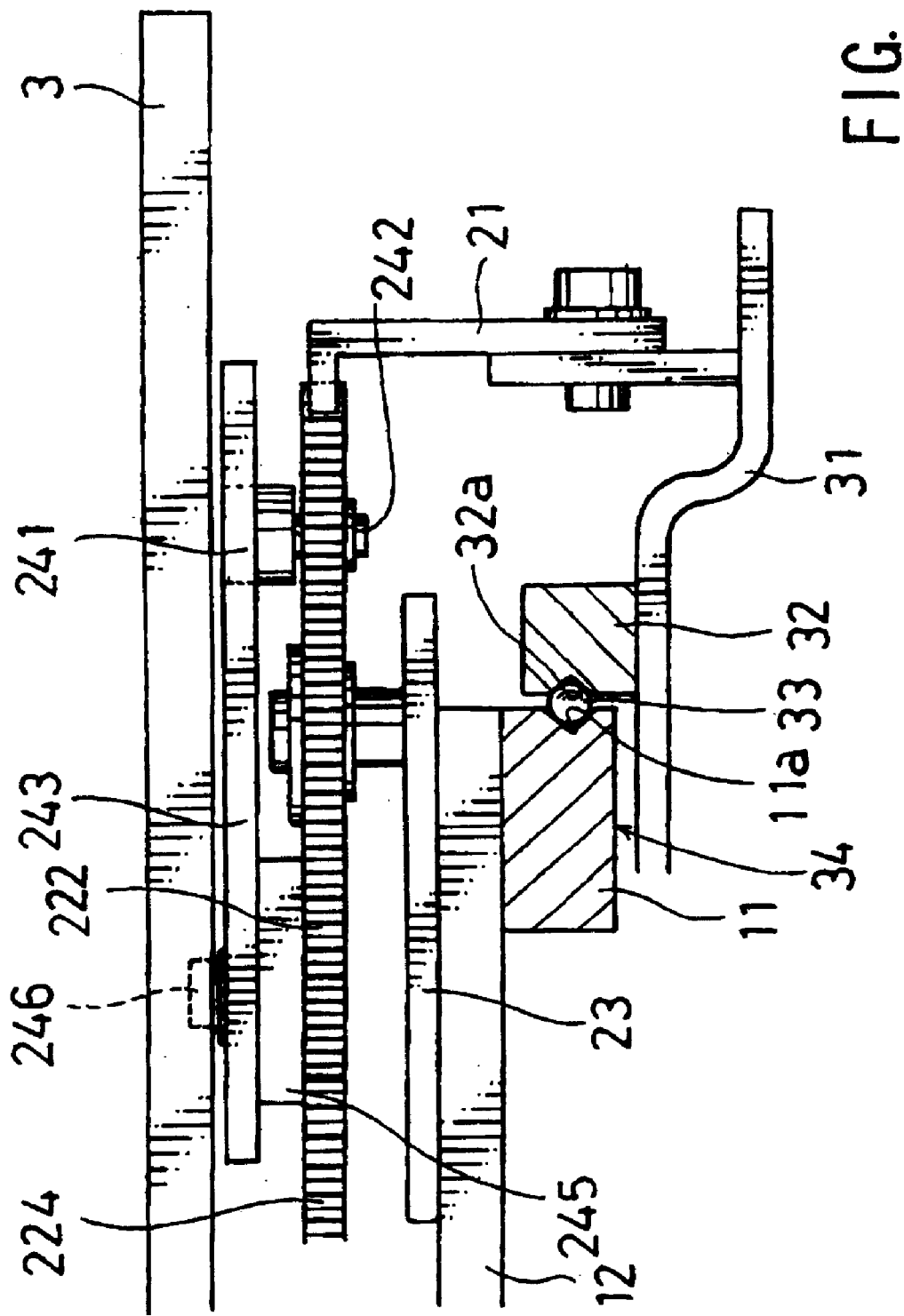
FIG. 30 is a view along the arrow line XXX of FIG. 28.

As shown in FIGS. 28 and 29, the cam surface 244 of the restricting cam 243 has a circular arc shape formed around the rotating center of the pinion gear 224 (the rotating center of rotary disc 13). Further, the cam surface 244 is formed with a guide surface 244*a* that comprises a bent surface continuously bent into an inner circumferential side. A rolling surface of the guide roller 241 of the restricting cam 243 is, as a whole, formed into a V-shaped configuration.

More specifically, in the rotating movement of the seat base 3, the cam surface 244 is engaged with the guide roller 241 in the solely rotating region so as to restrict rotation of the intermediate gear 222. The length of the cam surface 244 is set so as to release engagement with the guide roller 241 at the point of time when the position of the seat base 3 is changed from the solely rotating region to the interlocking region. When the engagement is released, the guide roller 241 is guided by means of the guide surface 244*a* so that the engagement of the intermediate gear 222 with the pinion gear 224 can be smoothly performed.

In this case, the guide surface 244*a* for guiding the guide roller 241 is made on the basis of a rotating locus (orbit) of the guide roller 241 and a rotating locus of the pinion gear 224.

Thus, in the solely rotating region until the seat base 3 transfers from a state shown in FIG. 28 to a state shown in FIG. 29, the cam surface 244 formed coaxially with the rotating center of the seat base 3 is moved while contacting the guide roller. During the movement, right-handed rotation of the intermediate gear 222 (rotation of the seat base 3 in a forward sliding direction) is restricted (slid locked state), and therefore, it is possible to suitably keep a relative positional relationship between the intermediate gear 222 and the pinion gear 224.

Meanwhile, in the case of a transfer from the solely rotating region to the interlocking region, the guide roller 241 is released from the cam surface 244 (slide lock is released) at the point of time when the pinion gear 224 starts to be engaged with the intermediate gear 222. Thereafter, the guide roller 241 is guided by the guide surface 244*a*. Thus, it is possible to smoothly engage the intermediate gear 222 with the pinion gear 224.

According to this representative embodiment, if the rotating seat 1 is rotated from the sitting position to the vehicle entry/exit position, during the change from the solely rotating region to the interlocking region, the pinion gear 224 and the intermediate gear 222 are mutually restricted in their motion by means of the cam surface 244, and thus, a predetermined positional relationship can be kept.

Thus, when the seat base 3 transfers from the solely rotating region to the interlocking region, the tooth skipping phenomenon and tooth tip interference are prevented, so that a preferable engagement of the pinion gear 224 with the intermediate gear 222 can be achieved. Thus, it is possible to smoothly change the rotating seat 1 from the solely rotating region to the interlocking region.

Further, according to this representative embodiment, the restriction is not removed immediately at the point of time when engagement is started, but the guide roller 241 is guided by means of the bent guide surface 244*a* so as to back up the engagement. Thus, it is possible smoothly engage the pinion gear 224 with the intermediate gear 222.

Figure 31:
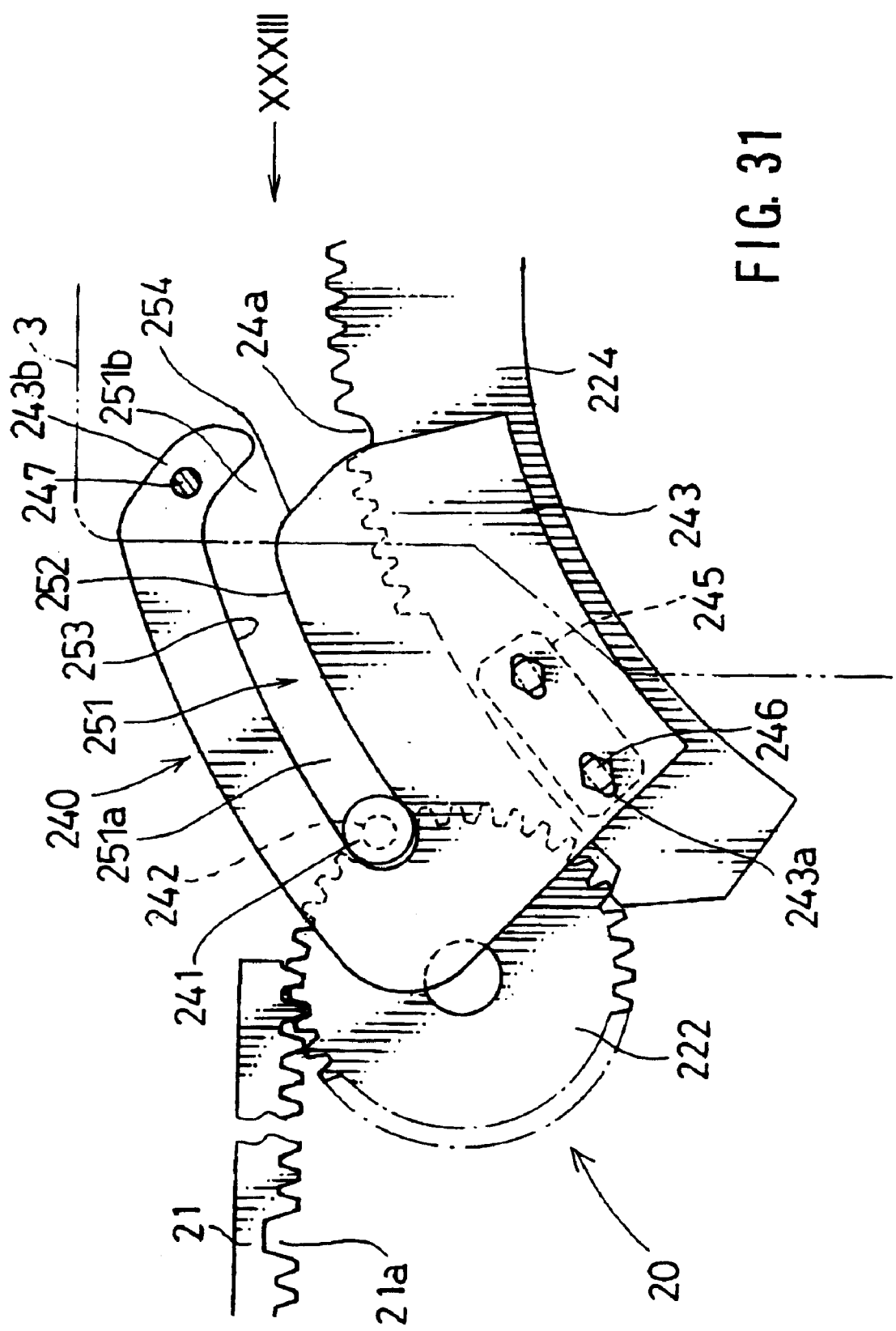
FIG. 31 is a top plan view showing a second representative embodiment of a slide lock mechanism used in the rotating vehicle seat at the state that the seat body is in the sitting position.
Figure 32:
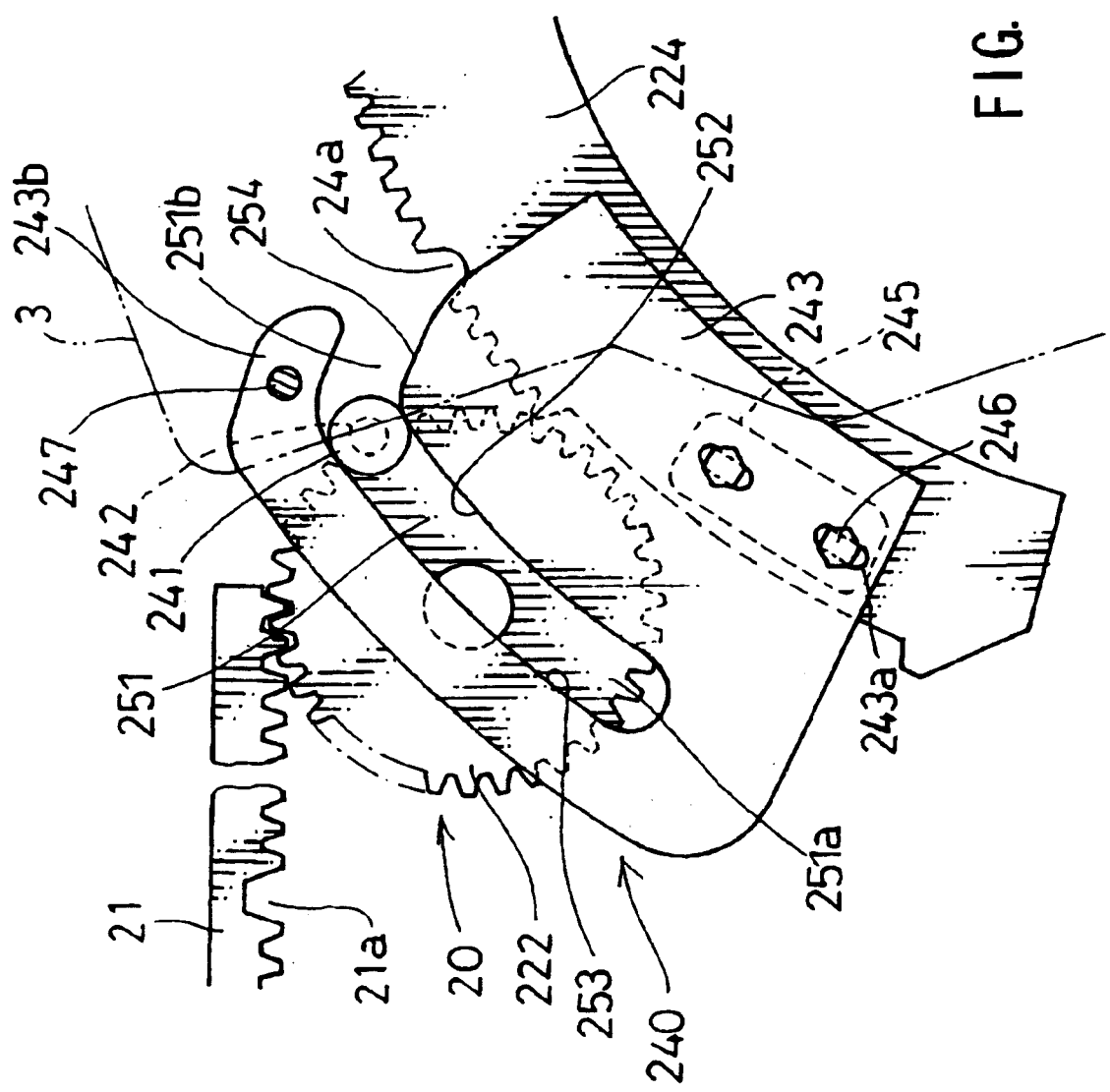
FIG. 32 is a top plan view showing a second representative embodiment of the slide lock mechanism used in the rotating vehicle seat at the state that the position of the seat body is changed from a solely rotating region to an interlocking region.
Figure 33:
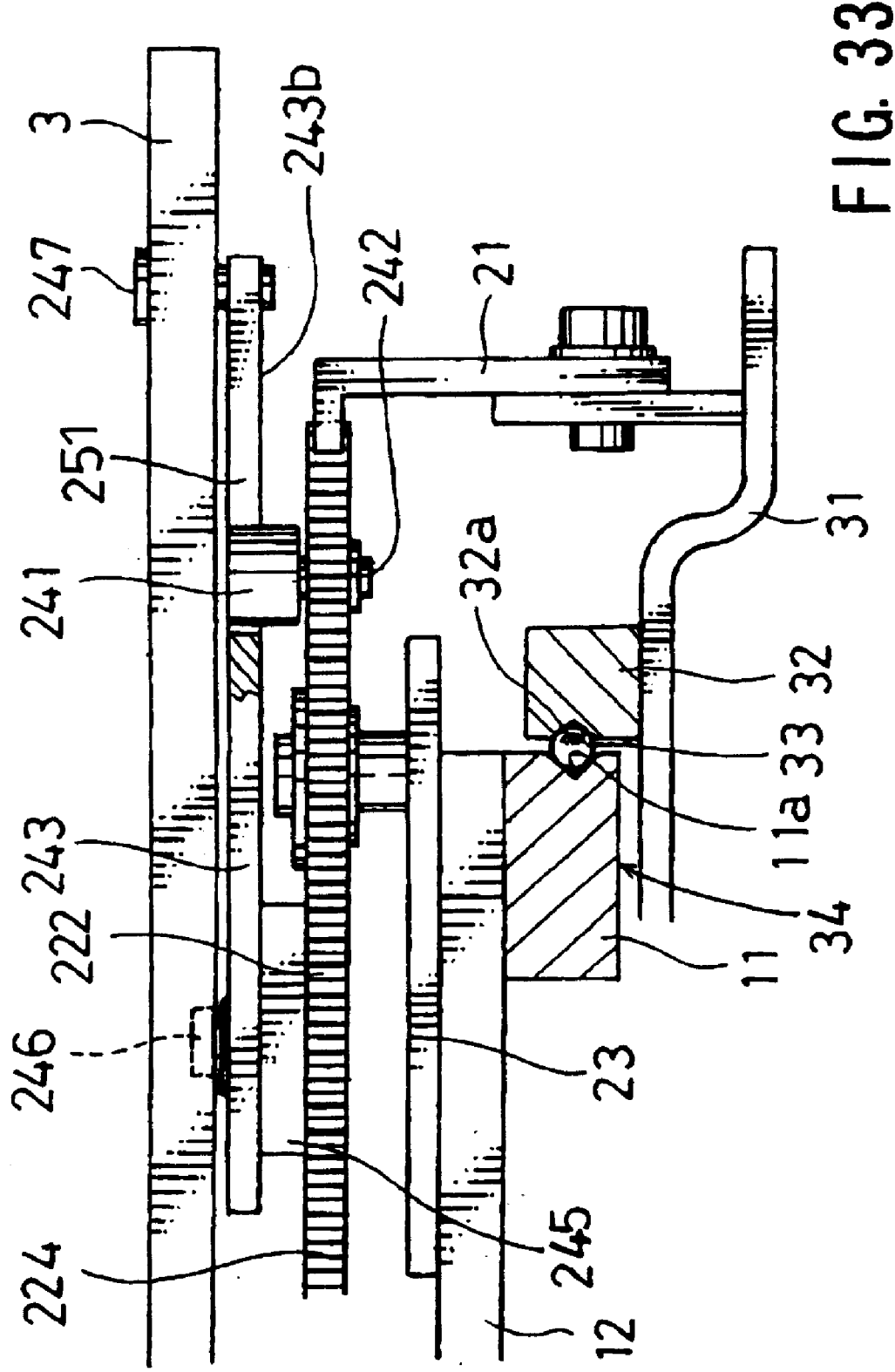
FIG. 33 is a view along the arrow line XXXIII of FIG. 31.

In the aforesaid electric motor type rotating vehicle seat of this representative embodiment, the slide lock device 240 for fixing the rotating support base 10 may be modified as shown in FIGS. 31 to 33. In this second representative embodiment, the restricting cam 243 is formed with a cam groove 251. As shown in FIGS. 31 and 32, the cam groove 251 of the restricting cam 243 is formed into a substantially V-shaped configuration that has a circular arc portion 251*a* around the rotating center of the pinion gear 224 (the rotating center of the rotary disc 13), and a bent portion 251*b* that extends in a state of being bent with respect to the circular arc portion 251*a*.

The cam groove 251 is designed as follows. When the seat base 3 is rotated, in the solely rotating region, the guide roller 241 is fitted into the circular arc portion 251a so that rotation of the intermediate gear 222 is restricted. At the point of time when the position of the seat base 3 changes from the solely rotating region to the interlocking region, the guide roller 241 can be removed from the circular arc portion 251a in accordance with the engagement of the intermediate gear 222 with the pinion gear 224. Further, when the guide roller 241 is removed, the guide roller 241 is guided by means of the bent portion 251b so that the engagement of the intermediate gear 222 with the pinion gear 224 can be smoothly performed.

Specifically, an inner peripheral groove wall of the circular arc portion 251a of the cam groove 251 is engaged with the guide roller 241 so as to operate as a cam surface 252 to restrict rotation of the intermediate gear 222. On the other hand, an outer peripheral groove wall of the circular arc portion 251a thereof facing the cam surface 252 operates as a guide surface 253 for guiding the guide roller 241. Further, an inner peripheral side of the bent portion 251b of the cam groove 251 is provided with a guide surface 254 for guiding the removal of the guide roller 241, like the above first representative embodiment. The guide surface 254 is made on the basis of a rotating locus of the guide roller 241 and a rotating locus of the pinion gear 224.

The restricting cam 243 is fixed on the upper surface of the pinion gear 224 by means of the fixing bolt 246 via the spacer 245. Further, a distal end portion 243b that constitutes the outer peripheral groove wall of the cam groove 251 is fixed to the lower surface of the seat base 3 by means of a fixing bolt 247 so as to secure a strength (see FIG. 33). The attachment hole 243a of the restricting cam 243 is formed into a slot so that the guide roller 241 can be smoothly rolled in the cam groove 251.

Components other than the above description of the slide lock device 240 of this second representative embodiment and components other than the slide lock device 240 have the same construction as the first representative embodiment, and are operated in the same manner as the first representative embodiment.

Therefore, according to this second representative embodiment of the slide lock device, in the solely rotating region from the state shown in FIG. 31 to the state shown in FIG. 32, the cam surface 252 of the circular arc portion 251a of the cam groove 251 formed coaxially with the rotating center of the seat base 3, is moved so as to be engaged with the guide roller 241 while the guide roller 241 being guided by means of the guide surface 253 facing the cam surface 252. For this reason, during the above movement, the intermediate gear 222 is restricted (slide locked state) in rotation in both directions, so that the relative positional relationship between the intermediate gear 222 and the pinion gear 224 can be properly maintained.

Thus, if the position of the seat base 3 changes from the solely rotating region to the interlocking region, a tooth skipping phenomenon or a tooth tip interference is prevented, so that a preferable engagement of the pinion gear 224 with the intermediate gear 222 can be achieved. Thus, it is possible for the rotating seat 1 to move smoothly from the solely rotating region to the interlocking region.

Moreover, when the position of the seat base 3 changes from the solely rotating region to the interlocking region, the guide roller 241 is removed from the cam surface 252 of the circular arc portion 251a of the cam groove 251 at the point of time when the pinion gear 224 starts to engage with the intermediate gear 222 (slide lock is released), while being guided by means of the guide surface 254 of the bent portion 251b. This serves to back up engagement of the intermediate gear 222 with the pinion gear 224, so that a smooth engagement can be realized.

The present invention is not necessarily limited to the above each representative embodiment, and various changes and modifications may be made within a scope without departing from the gist of the invention. For example, the seat body 2 has been attached to the seat base 3; in this case, the seat body 2 is attached to the seat base 3 via the swing type lift up mechanism. This swing type lift up mechanism may be changed into a slide type using a rail, and unless there is need to swing the seat body 2 outside the vehicle, the lift up mechanism may be omitted.

In the above seventh to tenth representative embodiments, the base 12 of the rotating support base 10 is briefly illustrated as comprising a single plate. Like the first representative embodiment, even if the base 12 is composed of three plates in the longitudinal direction, there is no problem.

Further, according to the above representative embodiments, in the rotation/slide interlocking mechanism 20 for interlocking the rotating movement of the seat body 2 with the sliding movement thereof, the sliding movement has been interlocked with the rotating movement in a partial region of the rotating movement. The sliding movement may be made over the entire region of the rotating movement. Moreover, the intermediate gear 22 is interposed between the pinion gear 24 and the rack 21, and thus, the rotation/slide interlocking mechanism 20 has been arranged on the interior side. The intermediate gear 22 may be omitted so that the rotation/slide interlocking mechanism 20 can be arranged on the door opening portion side.

Furthermore, the above representative embodiments have shown the case where the rotating seat is applied to a passenger seat. The rotating seat is applicable to other position, for example, a rear seat and a driver's seat.

In the first representative embodiment of the slide lock device 240, as shown in FIGS. 28 and 31, the guide roller 241 is located on the circumference of the tooth of the intermediate gear 222. The reason is that the guide roller 241 is located on the farthest position from the center of the intermediate gear 222; specifically a rotational radius of the guide roller 241 is made maximum, and thus, accuracy can be easily obtained. Even if the rotational radius of the guide roller 241 is set smaller, the accuracy is obtained; therefore, the rotational radius of the guide roller 241 is not specially limited to the maximum in the present invention. In addition, the rotating seat including the slide lock device 240 may be rotatably driven manually in place of power.

In order to make maximum the rotational radius of the guide roller 241, in the above representative embodiment, the intermediate gear 222 has a changed tooth shape so as to provide shaft portion of the vertical shaft 242 for attaching the guide roller 241. Thus, as shown in FIGS. 28 and FIG. 31, the rack 21 and the pinion gear 224 are partially formed with tooth lacking portions 21a and 24a equivalent to one tooth, respectively, so as to correspond to the changed tooth shape of the intermediate gear 222. These tooth lacking portions 21a and 24a are merely equivalent to one tooth; therefore, no problems arise in the actual gear engagement.

In the second representative embodiment of the slide lock device 240, in order to secure strength, the distal end portion 243b of the outer peripheral groove wall that constitutes the cam groove 251 of the restricting cam 243 is fixed by means of the bolt 247. However, this fixation by the bolt is not necessarily required, and may be omitted. Further, in this representative embodiment of the slide lock device 240, the restricting cam 243 has been provided with guide surfaces 244a and 254 that are bent continuously from the cam surfaces 244 and 252 formed around the rotating center of the pinion gear 224 (the rotating center of the rotary disc 13). Even if these guide surfaces 244a and 254 are omitted, it is possible to perform the invention.

It is understood that the motor 41 may be electrically, hydraulically, or pneumatically actuated or a combination thereof. Further, it is understood that the longitudinal translation of the rotating seat 1 may be either forward or rearward to effect entry as dictated by the disposition of the door D with respect to the rotating seat 1. Additionally, linear translation of the rotating seat 1 may occur for between one-half and three-quarters of the arc subtended by the rotating seat 1.

What is claimed is:

1. A rotating vehicle seat for use with a vehicle having a vehicle body, the seat being rotatable between a sitting position, in which the rotating vehicle seat is directed towards a front of the vehicle and a vehicle entry/exit position, in which the seat is directed towards a side of the vehicle, the rotating vehicle seat comprising:
   a support base capable of moving in a longitudinal direction of the vehicle;
   a rotating seat base disposed on the support base;
   a driving source that generates a driving force; and
   driving means comprising rotating means for rotating the seat base with respect to the support base by means of the driving force of the driving source and moving means for moving the support base in the longitudinal direction of the vehicle by means of a rotational force of the seat base, wherein the driving means only rotates the seat base when the seat base is disposed between the sitting position and an intermediate position, in which the seat base has been rotated by a predetermined angle to the vehicle entry/exit position from the sitting position, and the driving means rotates the seat base while moving the support base along the longitudinal direction of the vehicle when the seat base is between the intermediate position and the vehicle entry/exit position.

2. The rotating vehicle seat according to claim 1, wherein the rotating means comprises a reduction gear which is rotated by the driving force of the driving source and a pinion gear that engages the reduction gear.

3. The rotating vehicle seat according to claim 1, wherein the driving source is an electric motor.

4. The rotating vehicle seat according to claim 1, wherein the moving means comprises a pinion gear and a rack that engages the pinion gear.

5. The rotating vehicle seat according to claim 4, wherein the pinion gear and the rack are arranged and constructed so as not to engage each other between the sitting position and the intermediate position.

6. The rotating vehicle seat according to claim 4, wherein the pinion gear is attached to the seat base, and the rack is attached to the vehicle body.

7. The rotating vehicle seat according to claim 6, the moving means further comprising an intermediate gear, wherein the intermediate gear is rotatably attached to the support base.

8. The rotating vehicle seat according to claim 1, wherein the moving means comprises a pinion gear, an intermediate gear that is engaged with the pinion gear, and a rack that is engaged with the intermediate gear.

9. The rotating vehicle seat according to claim 8, wherein the pinion gear and the intermediate gear are arranged and constructed so as not to engage each other when the seat base is situated between the sitting position and the intermediate position.

10. The rotating vehicle seat according to claim 1, wherein the rotating means comprises an endless belt driven by the driving force of the driving source.

11. The rotating vehicle seat according to claim 1, wherein the rotating means comprises an arm, and an arm driving means that pushes and pulls the arm by means of the driving force of the driving source.

12. The rotating vehicle seat according to claim 11, wherein the arm driving means is a geared cable that is interposed between the driving source and the arm.

13. The rotating vehicle seat according to claim 11, wherein the arm driving means is a link that is interposed between the driving source and the arm.

14. The rotating vehicle seat according to claim 11, wherein the arm driving means comprises a ball screw that is rotated by the driving source, a ball nut that is screwed into the ball screw, and a link that is interposed between the ball nut and the arm.

15. The rotating vehicle seat according to claim 14, wherein the driving source is disposed forward of the support base, and the ball screw is arranged to be substantially parallel with the moving direction of the support base.

16. The rotating vehicle seat according to claim 14, wherein the driving source is disposed rearward of the support base, and the ball screw is arranged at a substantially right angle to the moving direction of the support base.

17. The rotating vehicle seat according to claim 1, wherein the rotating means comprises a ball screw rotated by the driving force of the driving source, a ball nut screwed into the ball screw, a rack connected to the ball nut, and a gear engaging with the rack.

18. The rotating vehicle seat according to claim 17, wherein the driving source is disposed forward of the rotating means.

19. The rotating vehicle seat according to claim 17, wherein the driving source is disposed rearward of the rotating means.

20. A rotating vehicle seat that can be rotated between a sitting position, in which the rotating vehicle seat is directed towards a front of the vehicle, and a vehicle entry/exit position, in which the seat is directed towards a side of the vehicle, comprising:
   a support base arranged and constructed to move in a longitudinal direction of the vehicle;
   a rotating seat base disposed on the support base;
   a driving source that generates a driving force; and
   driving means for rotating the seat base by means of the driving force of the driving source with respect to the support base, and moving the support base in the longitudinal direction of the vehicle, comprising:
      rotating means having an outer ring and an inner ring, one of the outer and inner rings being attached to the support base, the other thereof being attached to the seat base, and
      moving means having a rack, a pinion gear and an intermediate gear operably coupling the rack to the pinion gear, wherein the pinion gear is attached to seat base, and the rack is arranged and constructed to be coupled to a body of the vehicle.

21. A rotating vehicle seat that can be rotated between a sitting position, in which the rotating vehicle seat is directed towards a front of the vehicle, and a vehicle entry/exit position, in which the seat is directed towards a side of the vehicle, comprising:
- a support base capable of moving in a longitudinal direction of the vehicle;
- a rotating seat base disposed on the support base;
- driving means for simultaneously moving the seat base along the longitudinal direction of the vehicle and rotating the seat base when the seat base is between an intermediate position, in which the seat base has been rotated by a predetermined angle from the sitting position, to the vehicle entry/exit position, the driving means comprising a rack, a pinion gear and an intermediate gear operably coupling the rack to the pinion gear; and
- restricting means for restricting the support base from being moved in the longitudinal direction of the vehicle when the seat base is between the sitting position and the intermediate position.

22. The rotating vehicle seat according to claim 21, wherein the intermediate gear is rotatably attached to the support base, and the restricting means restricts the intermediate gear from rotating when the seat base is disposed between the sitting position and the intermediate position.

23. The rotating vehicle seat according to claim 22, wherein the restricting means comprises a guide roller provided in the intermediate gear, and a restricting cam that is attached to the seat base and has a cam surface engaged with the guide roller, and the cam surface is formed so that the intermediate gear does not rotate when the seat base is between the sitting position and the intermediate position.

24. The rotating vehicle seat according to claim 23, wherein the restricting cam has a cam groove with an inner peripheral wall, the inner peripheral wall of the cam groove operating as the cam surface.

25. The rotating vehicle seat according to claim 23, wherein the restricting cam is attached to the pinion gear.

26. A rotating vehicle seat shiftable between a sitting position and an outwardly directed vehicle entry/exit position, comprising:
- a support base translatable in a longitudinal direction of the vehicle;
- a rotating seat base operably, rotatably coupled to the seat base; and
- a drive mechanism operably coupled to the rotating seat base for rotating the seat base relative to the support base through a selected arc and for moving the support base in the longitudinal direction of the vehicle, the drive mechanism effecting only rotational motion of the support base for a first portion of the arc subtended by the rotating seat base and effecting simultaneous rotational and forward motion of the support base for a second portion of the arc subtended by the rotating seat base, the drive mechanism comprising a rack, a pinion gear and an intermediate gear operably coupling the rack to the pinion gear.

27. The rotating vehicle seat according to claim 26, wherein the drive mechanism further includes a motor driving the rotational and translational motion of the support base and the rotating seat base.

28. The rotating vehicle seat according to claim 27, wherein the drive mechanism further includes a reduction gear operably driven by a drive gear, the motor operably driving the drive gear and the reduction gear operably driving the rotating seat base.

29. The rotating vehicle seat according to claim 27, wherein the drive mechanism includes a rotatable ball screw, a ball nut being operably coupled to the ball screw, a rack provided in the ball nut, and a gear engageable with the rack.

30. The rotating vehicle seat according to claim 29, wherein the motor is disposed forward of the support base.

31. The rotating vehicle seat according to claim 29, wherein the motor is disposed rearward of the support base.

32. The rotating vehicle seat according to claim 27, wherein the pinion gear and the rack are arranged and constructed so as to operably disengage when the rotating seat base is disposed between the sitting position and the intermediate position, the intermediate position being intermediate between the sitting position and the vehicle entry/exit position.

33. The rotating vehicle seat according to claim 27, wherein the drive mechanism further includes at least one endless belt operably coupling the motor to the rotating seat base.

34. The rotating vehicle seat according to claim 27, wherein the drive mechanism further includes an arm, and an arm driver operably moving the arm, the arm driving being in mechanical communication with the motor.

35. The rotating vehicle seat according to claim 34, wherein the arm driver is a geared cable, the geared cable being rotatably coupled to the arm.

36. The rotating vehicle seat according to claim 34, wherein the arm drive includes a shiftable link interposed between the motor and the arm.

37. The rotating vehicle seat according to claim 34, wherein the arm driver includes a ball screw operably driven by the motor, a ball nut operably coupled to the ball screw, and a link interposed between the ball nut and the arm.

38. The rotating vehicle seat according to claim 27, the drive mechanism further comprising a ball screw, wherein the motor is disposed forwardly of the support base, and the ball screw being disposed substantially parallel with the translational direction of the support base.

39. The rotating vehicle seat according to claim 27, the drive mechanism further comprising a ball screw, wherein the motor is disposed rearwardly of the support base, and the ball screw being disposed at a substantially right angle with respect to the translational direction of the support base.

40. The rotating vehicle seat according to claim 26, wherein the pinion gear is fixedly coupled to the rotating seat base, the intermediate gear is rotatably coupled to the support base, and the rack is arranged and constructed to be fixedly coupled to a body of the vehicle.

41. The rotating vehicle seat according to claim 26, wherein the pinion gear and the rack are arranged and constructed so as to operably disengage when the rotating seat base is disposed between the sitting position and the intermediate position, the intermediate position being intermediate between the sitting position and the vehicle entry/exit position.

42. A rotating vehicle seat that is shiftable between a sitting position and a vehicle entry/exit position for use in a vehicle having a vehicle seat body, comprising:
- a support base arranged and constructed to be translatable in a longitudinal direction of the vehicle;
- a rotating seat base disposed on the seat base; and
- a drive mechanism operably coupled to the rotating seat base for rotating the seat base with respect to the support base, for linearly translating the support base in a lateral direction of the vehicle and for linearly translating the support base in a longitudinal direction of the vehicle, the drive mechanism including:

a rotary mechanism having a first ring and a second ring, the first ring disposed concentrically with the second ring and being rotatable with respect to the second ring, the first ring being fixedly coupled to the support base, the second ring being fixedly coupled to the seat base, a translational mechanism having a rack, a pinion gear and an intermediate gear operably coupling the rack to the pinion gear, the pinion gear being fixedly coupled to the seat base, and the rack being arranged and constructed to be fixedly coupled to the vehicle body, and a lock adapted to prevent rotational and longitudinal movement of the seat base when the seat is moving laterally.

43. A rotating vehicle seat that is shiftable between a sitting position and a vehicle entry/exit position of a vehicle, comprising:

a support base capable of moving in a longitudinal direction of the vehicle;

a rotating seat base disposed on the support base;

a drive mechanism for simultaneously translating the seat base and for rotating the seat base, said simultaneous rotation and translation being initiated when the seat base is at an intermediate position, the intermediate position being a disposition in which the seat base has been rotated by a predetermined angle from the sitting position, the drive mechanism comprising a rack, a pinion gear and an intermediate gear operably coupling the rack to the pinion gear; and a restricting mechanism for restricting the support base from translationally moving when the seat base is disposed between the sitting position and the intermediate position.

44. The rotating vehicle seat according to claim 43, wherein the restricting mechanism restricts the intermediate gear from rotating when the seat base is between the sitting position and the intermediate position.

45. The rotating vehicle seat according to claim 44, wherein the restricting mechanism comprises a guide roller provided in the intermediate gear, and a restricting cam that is attached to the seat base, the restricting cam having a cam surface engageable with the guide roller, the cam surface being formed so that the intermediate gear does not rotate when the seat base is between the sitting position and the intermediate position.

46. The rotating vehicle seat according to claim 45, the restricting cam defining a cam groove with a peripheral wall, wherein the cam surface is the inner peripheral wall of the cam groove.

47. The rotating vehicle seat according to claim 45, wherein the restricting cam is fixedly coupled to the pinion gear.

48. A method of shifting a vehicle seat between a first driving disposition, an intermediate disposition, and a second entry/exit disposition, the intermediate disposition being intermediate between the first driving disposition and the second entry/exit disposition comprising:

rotatably shifting the vehicle seat through an arc subtended by the vehicle seat and defined between the first and second seat dispositions; and linearly translating the vehicle seat simultaneously with the rotatable shifting of the vehicle seat through at least a portion of the arc subtended by the vehicle seat, the linear translation movement being carried out by a translational mechanism having a rack, a pinion gear fixedly coupled to the vehicle seat and intermediate gear operably coupling the rack to the pinion gear.

49. The method of claim 48 wherein the vehicle seat rotates through an arc of substantially ninety degrees.

50. The method of claim 48 wherein the linear translation of the vehicle seat occurs for between one-half and three-quarters of the rotational arc subtended by the vehicle seat.

51. The vehicle seat according to claim 50 wherein the vehicle seat is electrically powered between the first use disposition, the intermediate disposition and the entry/exit disposition.

52. The vehicle seat according to claim 51 wherein the vehicle seat has longitudinal motion simultaneous with rotational motion between the intermediate position and the entry/exit position.

53. A vehicle seat comprising:

a vehicle seat body normally positioned facing a forward direction of a vehicle, a vehicle seat support base coupled to the vehicle seat body, a rotary ring coupled to the vehicle seat support base and adapted to permit the vehicle seat to rotate approximately 90°, a guide coupled to the vehicle seat support base, a longitudinal support disposed along a longitudinal direction of the vehicle, wherein the guide and the longitudinal support are engaged and adapted to permit the vehicle seat to move in the forward direction, wherein the vehicle seat is arranged and constructed to move in the forward direction while rotating for at least a portion of the rotational range, a drive source, a rack, a pinion gear and an intermediate gear operably coupling the rack to the pinion gear, and wherein the rack, pinion gear and intermediate gear operably couple the vehicle seat support base to the longitudinal support, and a transmission coupling the drive source to the rotary ring.

54. A vehicle seat as in claim 53, wherein the transmission comprises an endless belt disposed around the rotary ring.

55. A vehicle seat as in claim 53, wherein the transmission comprises gears.

56. A vehicle seat as in claim 53, wherein the transmission comprises a pushing/pulling arm.

57. A vehicle seat as in claim 53, wherein the transmission comprises a ball screw transmission.

58. A vehicle seat as in claim 53, further comprising a lift up mechanism coupling the vehicle seat body to the vehicle seat base, wherein the vehicle seat body is detachable from the vehicle seat support base.

59. A vehicle seat as in claim 58, wherein the lift up mechanism comprises a pair of quadric link mechanisms.

60. A vehicle seat as in claim 53, further comprising a limit switch adapted to sense the rotational position of the vehicle seat and restrict longitudinal movement during a portion of the rotational movement.

61. A vehicle seat as in claim 53, further comprising a lock arranged and constructed to prevent rotational and longitudinal movement when the vehicle seat is moving laterally towards a door opening of the vehicle.

62. A vehicle seat comprising:

a seat body arranged and constructed to rotate about a pivotal axis, a pinion gear coupled to the seat body and adapted to rotate with the seat body, a rack disposed along a longitudinal direction of the vehicle, an intermediate gear coupling the pinion gear to the rack, wherein the rack is adapted to move the seat body in the longitudinal direction of the vehicle while the seat body is rotating about the pivotal axis for at least a portion of the rotational range, a drive source and a transmission coupling the drive source to the seat body.

63. A vehicle seat as in claim 62, wherein the transmission comprises a rotary ring configured and disposed to rotate the seat body and an endless belt disposed around the rotary ring.

64. A vehicle seat as in claim 62, wherein the transmission comprises a plurality of gears.

65. A vehicle seat as in claim 62, wherein the transmission comprises a pushing/pulling arm.

66. A vehicle seat as in claim 62, wherein the transmission comprises a ball screw transmission.

67. A vehicle seat as in claim 62, further comprising a vehicle seat support base and a lift up mechanism coupling the vehicle seat to the vehicle seat support base, wherein the vehicle seat is detachable from the vehicle seat support base.

68. A vehicle seat as in claim 67, wherein the lift up mechanism comprises a pair of quadric link mechanisms.

69. A vehicle seat as in claim 68, further comprising a limit switch adapted to sense the rotational position of the vehicle seat and restrict longitudinal movement during a portion of the rotational movement.

70. A vehicle seat as in claim 62, further comprising a lock arranged and constructed to prevent rotational and longitudinal movement when the vehicle seat is moving laterally towards a door opening of the vehicle.

71. A seat assembly for use in a vehicle, comprising:

a vehicle seat;

a base including a lower base section and an upper base section, the upper base section supporting the vehicle seat, a bearing assembly including a plurality of bearings adapted to rotatably support the upper base section on the lower base section, a pinion gear coupled to the lower base section, a rack arranged and constructed to be disposed along a longitudinal axis of the vehicle, an intermediate gear coupling the pinion gear to the rack, wherein the pinion gear and the rack are arranged and constructed to move the vehicle seat in a forward direction when the vehicle seat is rotating, a drive source and a transmission coupling the drive source to the bearing assembly.

72. A method for rotating a vehicle seat about a pivotal axis from a sitting position, in which the vehicle seat faces a front direction of a vehicle, to an entry/exit position, in which the vehicle seat faces a door opening, comprising:

rotating the vehicle seat about the pivotal axis from the sitting position to an intermediate position and rotating the vehicle seat about the pivotal axis and simultaneously longitudinally moving the pivotal axis from the intermediate position to the entry/exit position, wherein the vehicle seat moves forward towards the front of the vehicle and wherein a motor drives the rotational movement, the forward movement being coupled to the rotational movement by a transmission, the longitudinal movement being carried out by a rack, a pinion gear fixedly coupled to the vehicle seat and an intermediate gear operably coupling the rack to the pinion gear.

73. A method as in claim 72, further comprising laterally moving the vehicle seat into a door opening when the vehicle seat reaches the entry/exit position.

74. A method as in claim 73, wherein the rotational and longitudinal movement of the vehicle seat are prevented when the vehicle seat is moving laterally.

75. A vehicle seat, comprising:

a seat body arranged and constructed to rotate about a pivotal axis, a pinion gear fixedly coupled to the seat body and arranged and constructed to rotate with the seat body, a support arranged and constructed to be disposed along a longitudinal direction of a vehicle, the support supporting the seat body, a rack arranged and constructed to be fixedly coupled to a floor of the vehicle, and an intermediate gear coupling the pinion gear to the rack, wherein the seat body, the pinion gear, the support, the rack, and the intermediate gear are further arranged and constructed to enable the seat body to rotate around the pivotal axis while moving along the longitudinal direction of the vehicle.

* * * * *